(12) United States Patent
DuFaux et al.

(10) Patent No.: US 7,633,398 B2
(45) Date of Patent: Dec. 15, 2009

(54) APPARATUS AND METHOD FOR MEASURING PRECIPITATION

(75) Inventors: Douglas Paul DuFaux, Orchard Park, NY (US); John Paul Higgins, Weddington, NC (US)

(73) Assignee: Noonan Technologies, LLC, Summerville, SC (US)

( * ) Notice: Subject to any disclaimer, the term of this patent is extended or adjusted under 35 U.S.C. 154(b) by 295 days.

(21) Appl. No.: 11/601,598

(22) Filed: Nov. 17, 2006

(65) Prior Publication Data
US 2007/0132599 A1   Jun. 14, 2007

Related U.S. Application Data

(60) Provisional application No. 60/738,086, filed on Nov. 19, 2005.

(51) Int. Cl.
G08B 21/00    (2006.01)
(52) U.S. Cl. .................. 340/602; 340/604; 340/619
(58) Field of Classification Search ........... 340/601, 340/602, 603, 604, 609, 610, 618, 619, 630; 347/55, 85; 318/483; 436/539
See application file for complete search history.

(56) References Cited

U.S. PATENT DOCUMENTS

| | | | |
|---|---|---|---|
| 4,305,280 A | | 12/1981 | Vonnegut et al. |
| 4,578,995 A | | 4/1986 | Meyer |
| 4,639,831 A | | 1/1987 | Iyoda |
| 4,656,333 A | | 4/1987 | Murphy |
| 4,895,022 A | | 1/1990 | Noren |
| 5,020,903 A | | 6/1991 | Sakai et al. |
| 5,057,754 A | * | 10/1991 | Bell ........................ 318/483 |
| 5,138,301 A | | 8/1992 | Delahaye |
| 5,533,391 A | | 7/1996 | Brade et al. |
| 5,557,040 A | | 9/1996 | Inenaga et al. |
| 5,571,963 A | | 11/1996 | Balchin et al. |
| 5,744,711 A | | 4/1998 | Rasmussen et al. |
| 5,780,718 A | | 7/1998 | Weber |

(Continued)

FOREIGN PATENT DOCUMENTS

GB    1235123    *   6/1971

OTHER PUBLICATIONS

Nafis, Chris, 1-Wire Snowfall/Snow Depth Sensor (Automated Snowboard), www.howmuchsnow.com/snow/, 2004-2005, pp. 1-9, USA.

*Primary Examiner*—Van T. Trieu

(57) ABSTRACT

A precipitation gauge for measuring liquid and frozen precipitation is provided according to the present invention that includes a support structure having at least one light sensor, or pair of electrodes, and at least one light source disposed thereon so that the light sensor may receive light that is emitted from the light source. The light sensor or light sensors and the light source or light sources generally extend a substantial height of the support structure. The light sensor or light sensors generate an output signal in response to the amount of light received from the light source. A microprocessor receives the output signal or output signals from the light sensor or light sensors and determines whether precipitation is present between the light sensor or light sensors and the light source or light sources. Based on the output signal or output signals, the microprocessor determines and displays the level of precipitation. The microprocessor may also determine the density of frozen precipitation.

15 Claims, 12 Drawing Sheets

U.S. PATENT DOCUMENTS

| | | |
|---|---|---|
| 5,850,619 A | 12/1998 | Rasmussen et al. |
| 6,044,699 A | 4/2000 | Greenblatt et al. |
| 6,124,139 A * | 9/2000 | Saito et al. ............... 436/539 |
| 6,751,571 B1 | 6/2004 | Hallett et al. |
| 6,843,556 B2 * | 1/2005 | Nelson et al. ............... 347/85 |
| 6,927,385 B2 | 8/2005 | Adamietz et al. |

* cited by examiner

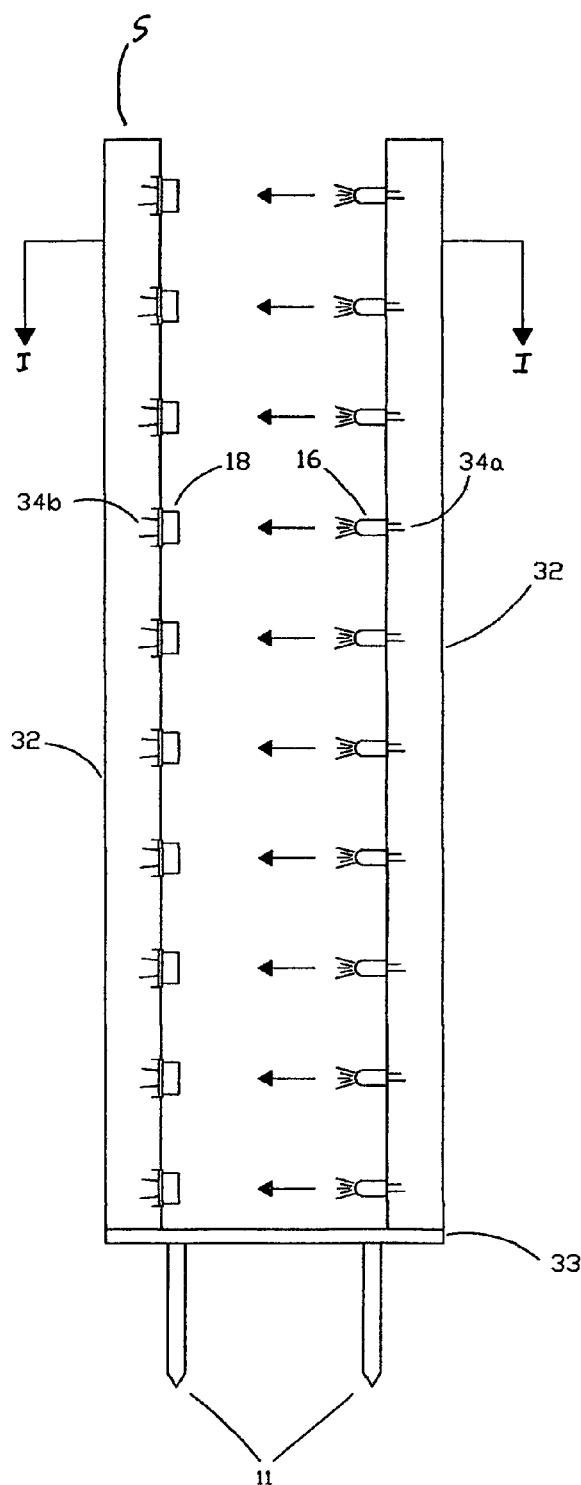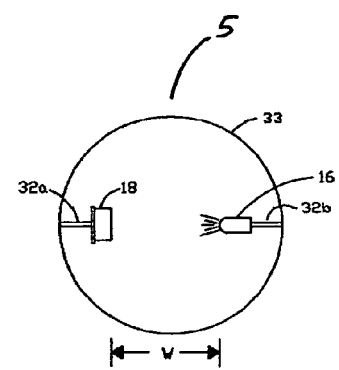
Figure 3a
Figure 3

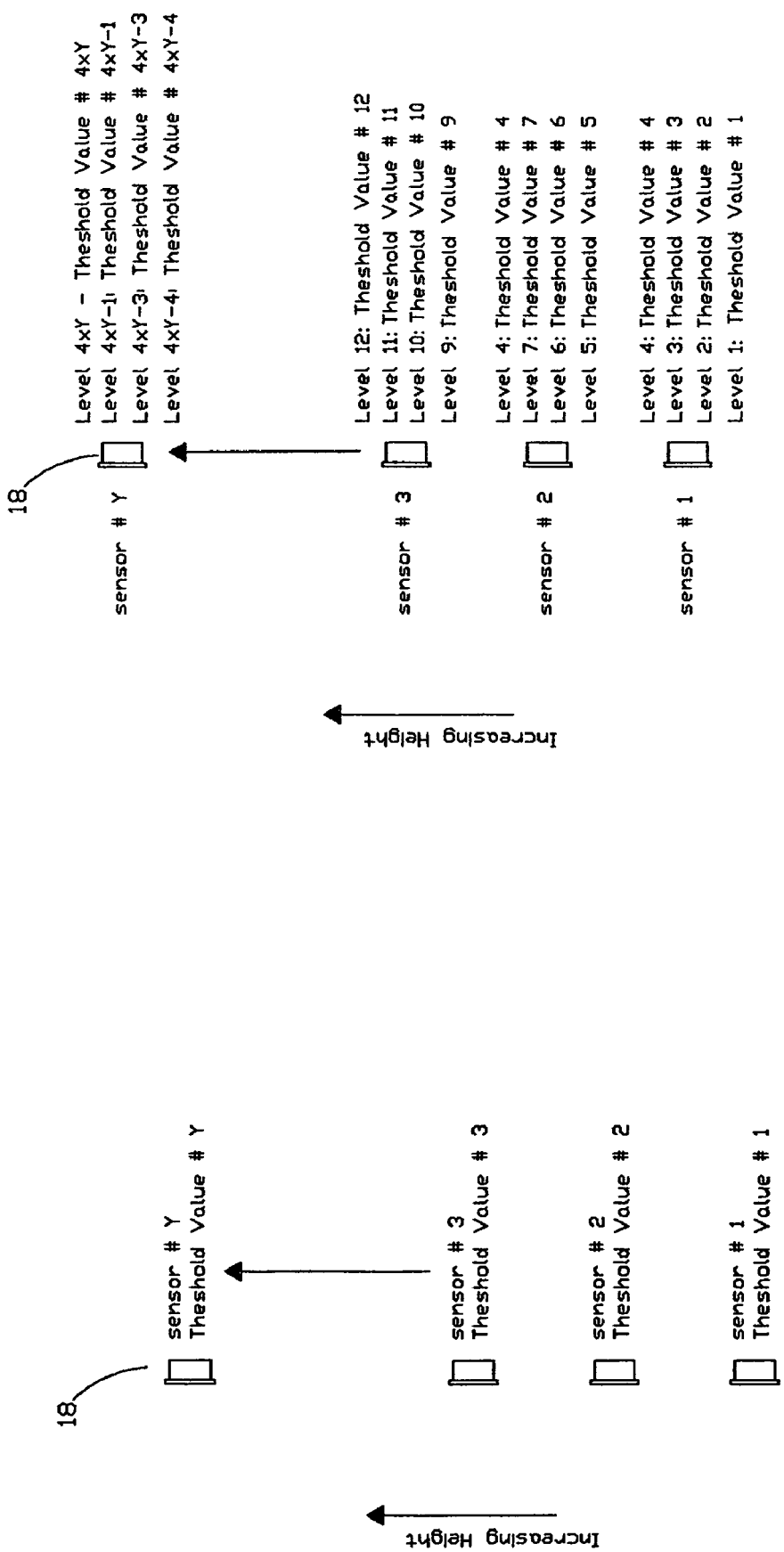

APPARATUS AND METHOD FOR MEASURING PRECIPITATION

CROSS REFERENCE TO RELATED APPLICATIONS

This application claims the benefit of U.S. Provisional Application Ser. No. 60/738,086 filed Nov. 19, 2005.

BACKGROUND OF THE INVENTION

Although precipitation may be measured by manual or electronic means, electronic instruments that measure rainfall typically do not measure snowfall and vice versa. In fact, frozen precipitation is difficult to measure by electronic instrument. While snowfall may be measured manually by a simple gauge comprising a cylinder having a measurement scale affixed to it, snowfall is difficult to measure by electronic instrument.

Snowfall may be measured electronically by a gauge that melts the snow to water and converts the amount of snow fall to a liquid equivalent. U.S. Pat. No. 6,044,699 discloses such a gauge. The gauge comprises a support structure or an open cylinder, a reservoir for collecting precipitation, means for weighing the reservoir and electronic means for converting the weight measurement to accumulated precipitation. The cylinder includes a small, steeply sloped tapered section to reduce turbulence around the collector. The length of the collector assembly is minimized to reduce area for frozen precipitation to accumulate. The cylinder is heated sufficiently to raise the temperature of the collector assembly so that frozen precipitation is melted. U.S. Pat. No. 5,744,711 discloses a winter precipitation measuring system for quantifying the precipitation rate of winter precipitation that attempts to overcome problems associated with the weighing type snow gauge as disclosed in the '699 patent. The system includes an elongated tube, a thermal plate within the tube and an apparatus for maintaining the thermal plate at a substantially constant temperature relative to a reference plate and for determining a precipitation rate in response to the difference in power consumption required to maintain the thermal plate at a substantially constant temperature. These snow gauges do not provide the amount of snow fall in depth nor do they measure the "wetness" or density of the snow which would be useful in areas where snow blowing equipment is used.

Other patents disclose devices for detecting frozen precipitation and differentiating between rain and frozen precipitation. For example, U.S. Pat. No. 4,656,333 discloses a moisture sensing detector of snow, sleet, ice and rain. The detector includes a sensing probe and coacting control circuitry for receiving the moisture signal from the probe and actuating associated equipment. The probe includes electrically charged electrodes spaced apart by a small distance. Any moisture bridging the gap completes a circuit between the electrodes. This device only detects moisture or precipitation but does not measure the amount or rate of precipitation. U.S. Pat. No. 5,557,040 discloses a method and apparatus for precipitation detection and differentiation. A direct backscatter technique provides for the detection of precipitation in a measuring volume. A source light beam is projected into the measuring volume. Light in the volume, including source light scattered from any precipitation within the volume, is collected and detected. A signal is generated corresponding to the detected light. This signal is used to determine whether precipitation is present in the measuring volume. The light scattered from precipitation within the measuring volume may also be used to differentiate between types of particles such as rain or snow. Rain or snow can be differentiated based on whether the transmitted light changed from its original polarization state. Thus, while the '040 patent discloses an apparatus and method for detecting the presence of precipitation and differentiating between rain and snow, the patent does not disclose a method or apparatus for measuring the amount of frozen precipitation that has fallen or the rate at which frozen precipitation falls.

U.S. Pat. Nos. 3,942,762 and 5,138,301 disclose a well-known type of rain gauge comprising a stationary reception funnel having a water discharge nozzle at its lower end. A receptacle having two symmetrical compartments of a known volume is located below the discharge nozzle. As one compartment fills with water it rocks in one direction to dump the water and to allow the other compartment to fill with water. A switch that is affixed to the receptacle is opened and closed by the rocking motion. From the cross-sectional area of the input of the funnel and from the amount of water which causes the receptacle to rock, the amount of precipitation can be determined by counting the number of times the switch has opened and closed for a given period of time. This instrument cannot, however, measure snowfall.

U.S. Pat. No. 4,305,280 discloses a rainfall intensity sensor that measures the rate of rainfall or snowfall by determining the electrical power required to evaporate water or snow as it contacts an exposed sensor. A number of assumptions are made in order to correlate the electrical power used by the device with the rate of rainfall or snowfall which may affect the accuracy of this device. Moreover, the device disclosed in the '280 patent does not determine the total amount of rain or snow (i.e., in inches) that fallen over a certain period of time or the density of the snowfall.

A snow gauge device which uses an infrared proximity sensor is disclosed at the website www.howmuchsnow.com/snow/. The infrared proximity sensor, such as an infrared triangulation measurement sensor, comprises a light detector and light emitter that are adjacent to each other. The sensor is attached near the top of a vertical post that is mounted on a base board so that the light emitter and light detector are pointed downwardly toward the base at an angle. As snow accumulates on the base, the infrared LED emits a beam of light, which is reflected off of the snow and back to the detector, which is a linear array. The location that the reflected light strikes the linear array is related to the distance that the snow is from the sensor. An ultrasonic sensor may be used but must be mounted perpendicular to the snow surface because the ultrasonic beam is wide and hard to focus on a surface. This snow gauge device may be limited to the height of snowfall that it can measure and is not capable of measuring rainfall.

With the advance of electronics, electronic weather stations that provide wind speed temperature, humidity, pressure, and rainfall have become popular, particularly for residential use. Because of the difficulty of automating the measurement of frozen precipitation, these weather stations do not provide measurements of frozen precipitation, particularly snow. The prior art snow gauges are not suitable for electronic weather stations made for residential use. These prior art gauges are expensive or do not provide electronic display of the amount of frozen precipitation that has fallen in a given time period. Instead, the prior art snow gauges provide the amount of frozen precipitation in liquid equivalent or the amount of snow must be manually read from a scale on the snow gauge.

What is needed is a simple, relatively inexpensive instrument to measure, display, and record amounts of precipitation whether rain, snow, sleet or frozen rain. What is particularly needed is an instrument that measures frozen precipitation in, for example, inches—not liquid equivalent. What is also needed is an instrument that measures both liquid and frozen precipitation and records and displays the rate of the falling precipitation. What is further needed is an instrument that measures, records and displays the rate of the precipitation. What is also needed is an instrument that determines the density of frozen precipitation, particularly snow, so that snow blowing equipment can be adjusted and operated for optimum use.

SUMMARY OF THE INVENTION

It is an object of the present invention to provide a simple, inexpensive instrument that measures, records, and displays the amount and rate of precipitation which has fallen in the area of the instrument in actual depth units such as inches, feet, centimeters or meters. It is also an object of the present invention to provide an instrument that measures the amount and rate of liquid and frozen precipitation. It is a further object of the present invention to provide an instrument that determines the amount of liquid and frozen precipitation and stores and displays data regarding the amounts of liquid and frozen precipitation over a predetermined time period. These and other object of the present invention are provided by an instrument for determining an amount of precipitation comprising a support structure and a single light source or at least one light source disposed on the support structure and a single light sensor or at least one light sensor disposed on the support structure.

In one embodiment, the support structure is configured so that it can hold precipitation. The support structure may comprise a cylindrical side wall having two opposed ends. A bottom wall is disposed over one end so that the cylinder may hold precipitation. In another embodiment, the support structure may also comprise an inner cylindrical inner side wall and a cylindrical outer side wall each inner and outer side walls having opposed ends. A bottom inner wall is disposed on one end of the inner cylindrical side wall so that the support structure may hold precipitation. Optionally, one end of the outer cylindrical side wall extends beyond one end of the inner cylindrical side wall and an outer bottom wall is disposed on the end of the outer cylindrical side wall. On the opposite end of the inner and outer cylindrical side walls, a top wall extends from the outer cylindrical side wall to the inner cylindrical side wall leaving an opening into the space within the inner cylindrical side wall. An opening is preferably disposed in the bottom wall of the inner cylinder so that any accumulated precipitation may be drained so that subsequent precipitation events may be measured. A valve may be disposed at or near the opening to control when the accumulated precipitation drains from the support structure. The valve may be a control valve that is controlled by a controller, user or microprocessor. In yet another embodiment, the support structure may comprise two vertical support structures such as two rods, flat bars, or poles that are spaced a finite distance apart from each other and that extend substantially vertically.

At least one light source and at least one light sensor are disposed on the support structure. The light sensor or light sensors disposed on the support structure are spaced a predetermined distance from the light source or light sources and are positioned to receive light from the light source or light sources. If two flat bars, two rods or two poles are used as the support structure, the light sensor and light source are disposed on their respective rods, flat bars or poles so that the light sensor receives light from the light source. If one light source and one light sensor are used, the light source and light sensor preferably extend substantially the height of the support structure. However, the light source and light sensor may extend any predetermined portion of the height of the support structure, including but not limited to at least about ten percent, twenty percent, thirty percent, forty percent, fifty percent, sixty percent, seventy percent, eighty percent, or ninety percent. The light sensor receives light from the light source and generates an output signal in response to receiving light from the light source. The output signal generated by the light sensor varies in magnitude in response to light that the light sensor receives from the light source. The output signal may be current, resistance, voltage, impedance or capacitance. As precipitation falls and accumulates between the light sensor and light source, the light sensor receives less light from the light source and the output signal from the light sensor changes in response to the light sensor receiving less light from the light source.

The light sensor may be connected to a switch which opens or closes a circuit in response to a change in the output signal from the light sensor. For example, when the output signal from a light sensor is less than or equal to a predetermined value, indicating that precipitation is present between the light sensor and light source, the switch closes a circuit. When the output signal is greater than a predetermined value, indicating that precipitation is not present between the light sensor and light source, the switch opens a circuit or keeps the circuit open. The circuit is connected to a display which indicates that the circuit is open or closed thereby indicating a level of precipitation.

In another embodiment, the light sensor is connected to a microprocessor which receives the output signal from the light sensor. In one embodiment, the microprocessor compares the output signal from the light sensor at predetermined time intervals, for example, one thousandth of a second, one hundredth of a second, one tenth of a second, one second, and one minute, with one or more predetermined threshold values to determine the level of precipitation in or nearby the support structure. The microprocessor may also continuously receive the output signal from the light sensor and continuously determine or calculate the level of precipitation. The microprocessor receives said signal from each of the plurality of light sensor and determines an amount of accumulation of precipitation based on the signals. For example, the microprocessor compares a signal from each of the light sensors with a predetermined threshold value and assigns a binary number for each of the light sensor based on the comparison thereby generating a binary string or sequence where each binary number in the string or sequence represents the presence or absence of precipitation at the sensor. The microprocessor is programmed to receive an output signal from each of the light sensor when precipitation is absent from the support structure and to compare each signal with an initial signal from each of the light sensor when precipitation is absent to determine when any of the light sensor or light sources or both light sensor and light sources may require cleaning. In another embodiment, the microprocessor determines or calculates the level of precipitation from the output signal from the light sensor or light sensors using a correlation or formula. The microprocessor displays the level of precipitation for the user. The microprocessor preferably includes an internal clock so that the microprocessor may determine or calculate the rate of precipitation by dividing the changes in the level of precipitation by predetermined time intervals. The microprocessor can convert the rate of precipitation into standard units such as inches per hour. The microprocessor may also include memory and a calendar so that amounts of precipitation may be stored for later retrieval.

In another embodiment, a plurality of light sensors are disposed in a vertical arrangement on the support structure and each of the plurality of light sensors is spaced a predetermined distance from each adjacent light sensor. A plurality of light sources are disposed in a vertical arrangement on the support structure and each of the plurality of light sources is spaced a predetermined distance from each adjacent light source. Each light sensor is positioned to receive light from at least one light source. Preferably, the plurality of light sensors and light sources extend substantially the height of the support structure. The plurality of light sensors and light sources may extend any predetermined portion of the height of the support structure, including but not limited to at least about ten percent, twenty percent, thirty percent, forty percent, fifty percent, sixty percent, seventy percent, eighty percent, or ninety percent. Each light sensor is capable of generating an output signal in response to light that is received from at least one of the light sources. The output signal may be a current, resistance, voltage, impedance or capacitance. As precipitation accumulates between the light sensors and light sources, the precipitation reduces the amount of light that the light sensors receive from the light sources and the output signal from the light sensors change in response to the light sensors receiving less light from the light source. Typically, the output of the light sensor decreases in proportion to the decrease in the amount of light that the light sensor receives.

In one embodiment, the single light sensor or each of the plurality of light sensors is connected to a switch which opens or closes a circuit in response to a change in the output signal from each of the light sensors. For example, when the output signal from the light sensor is less than or equal to a predetermined value, the switch closes a circuit thereby indicating that precipitation is blocking light to the light sensor and has reached the height of the light sensor. When the output signal from the light sensor is greater than a predetermined value the switch opens or keeps open a circuit thereby indicating that precipitation is not blocking light to the light sensor. Each circuit is connected to a display which indicates that the circuit is open or closed thereby indicating a level of precipitation.

In another embodiment, the single light sensor or each of the plurality of light sensors is connected to a microprocessor which receives the output signal from the light sensor. Each of the plurality of light sources may be connected to the microprocessor in series or in parallel. The microprocessor compares the output signal from each sensor at predetermined time intervals, for example, as one thousandth of a second, one hundredth of a second, one tenth of a second, one second, and one minute, with one or more predetermined threshold values to determine presence or absence of precipitation between the light sensor and light source and also determines the level of precipitation in or near the support structure. The microprocessor may also continuously receive the output signal from the light sensor or light sensors and continuously determine or calculate the level of precipitation. The microprocessor is programmed to determine the level of precipitation in or near the support structure by comparing the output signal from the light sensor or light sensors with a database of predetermined threshold values. The microprocessor compares the output signal from the single light sensor or each of the plurality of light sensors to a predetermined threshold value and assigns a binary number based on the comparison. The binary number represents the presence or absence of precipitation at the light sensors. The microprocessor may also be programmed to calculate the level of precipitation in or near the support structure from the output signal of the single light sensor or each of the plurality of light sensors using a formula or equation that relates the magnitude of the output signal of the sensor or light sensors with the level of precipitation in the support structure. The formula or equation for use in determining the amount of rain may be determined by incrementally or gradually filing the support structure with water and measuring the output signal of the light sensor. The formula or equation for use in determining the amount of frozen precipitation may be determined at by incrementally or gradually filling the support structure with shaved ice or similar material and measuring the output signal of the light sensor. As rain or shaved ice is placed into the support structure, the output signal of the light sensor will decrease. The resulting relationship between the magnitude of the output signal of the light sensor and the level or amount of rain in the support structure may be graphed or converted into an equation and programmed into the microprocessor. Similarly, the resulting relationship between the magnitude of the output signal of the light sensor and level or amount of frozen precipitation in the support structure may be graphed or converted into an equation and programmed into the microprocessor. The microprocessor is then able to receive the output signal from the light sensor or light sensors and determine the amount or level of precipitation in or near the support structure. The microprocessor may include a display or transmit a signal to a display indicating the level of precipitation. The microprocessor may also determine the rate of precipitation by dividing the changes in the level of precipitation by predetermined time intervals. The microprocessor may convert the rate of precipitation into standard units such as inches per hour or centimeters per hour. The microprocessor may include memory to store the amount of precipitation in a database to provide historical data on the amount of rainfall, snowfall and other precipitation which can be accessed by the user.

A vibrating device, capable of vibrating the support structure for removing pockets of air from frozen precipitation, may be attached to the support structure. A drain valve may be disposed in the closed end for draining precipitation from the cylinder. The drain valve may be operably connected to the microprocessor for opening and closing at predetermined time periods. The instrument may also include a temperature sensor that is capable of transmitting a temperature signal to the microprocessor. The instrument may also include a moisture sensor that is capable of transmitting a signal to the microprocessor to indicate the presence or absence of moisture in or near the support structure. The temperature sensor and the moisture sensor are capable of connecting the microprocessor to a power source. The precipitation instrument may also include a heating element to melt frozen precipitation, thereby allowing the instrument to measure a separate frozen precipitation event, and a solid state cooling device to maintain the temperature of the support structure below 32° F. to prevent frozen precipitation from sticking to or building up on the sides of the support structure, or the light sensors or light sources. The valve, heating element, and/or solid state cooling device may be controlled by a controller or microprocessor. The valve, heating element and solid state cooler may also be controlled by a user.

Yet another embodiment the present invention is an instrument for measuring precipitation comprising a support structure, a linear translation device having a rotatable shaft and motor. The linear translation device is connected to the support structure, and at least one light sensor is connected to the shaft of the linear translation device. The shaft has a pitch such as a screw so that as the motor turns the shaft, the light sensor moves upwardly or downwardly. A light source is also disposed on the support structure. The light source and light sensor are positioned such that the light sensor is capable of receiving light from the light source. The light sensor is capable of generating an output signal in response to receiving light from the light source. A microprocessor determines the position of the light sensor on the linear translation device, receives the output signal from the light sensor, and determines a level of precipitation in response to the output signal and position of the light sensor. The microprocessor sends a command signal to the linear translation device to move the light sensor upwardly or downwardly in predetermined distances until the light sensor is positioned at or near the level of precipitation in the support structure. The microprocessor is capable of transmitting a signal to display the level of precipitation.

In another embodiment, a second sensor is mounted on the shaft of the linear translation device so that a first and a second light sensor are spaced a predetermined vertical distance from each other. A microprocessor receives or determines the position of the first and second sensor on the linear translation device, receives the output signals from the first and second light sensor, and determines a level of precipitation in response to the output signals from the first and second light sensor and the vertical positions of the first and second light sensors. The microprocessor compares the output signals from each light sensor with a predetermined threshold value to determine if precipitation is between the first (lower) light sensor and the light source and if precipitation is between the second (higher) light sensor and the light source. If the output signal is less than or equal to a predetermined threshold value, the microprocessor determines that precipitation is between the light sensor and the light source. If the output signal is greater than a predetermined threshold value, the microprocessor determines that precipitation is between the light sensor and the light source. The microprocessor sends a signal to the linear translation device to position the first and second sensors so that the output signal from the first light sensor is less than or equal to a predetermined threshold value and the output signal from the second light sensor is greater than or equal to a predetermined threshold value.

In yet another embodiment, the precipitation instrument also comprises a support structure capable of holding precipitation and a plurality of pairs of electrodes disposed in a vertical arrangement on the support structure. Each pair of electrodes has a gap between the electrode pairs. The pairs of electrodes are disposed on the support structure so that each of the pairs of electrodes is spaced a predetermined distance from each adjacent pair of electrodes. A circuit is connected to each of said pairs of electrodes capable of generating a signal when precipitation bridges said gap between at least one of the pairs of electrodes. A microprocessor receives said signal from each of the pairs of electrodes and generates an output indicating the presence or absence of precipitation.

The precipitation instrument of the present invention may include a transmitting device at or near the support structure that is capable of transmitting signals from one or more sensors or devices such as light sensors, light sources, a moisture sensors, and temperature sensors to a base unit such as a microprocessor or controller at a remote location, for example the inside of a building or residence. The transmitting device may transmit signals either by hard wire or wirelessly or both.

The present invention also includes a method for determining the amount of precipitation comprising: (a) projecting light from a plurality of light sources placed in a vertical arrangement to a plurality of light sensor placed in a corresponding vertical arrangement; (b) obtaining an output signal from each of the light sensor; (c) comparing the output signal from each of the light sensors with a predetermined threshold value, the value indicating the presence or absence of precipitation; (d) assigning a second value to each of the light sensors based on the comparison; and (e) determining the amount of accumulation of the precipitation based on the second value assigned to each of the light sensors. The present invention also includes a method for determining the amount of precipitation comprising: (a) projecting light from a light source extending substantially the height of a support structure to a light sensor extending substantially the height of a support structure; (b) obtaining an output signal from the light sensor; (c) comparing the output signal from the light sensor with a predetermined threshold value, the value indicating the presence or absence of precipitation; (d) assigning a second value to each of the light sensor based on the comparison; and (e) determining the amount of accumulation of the precipitation based on the second value assigned to each of the light sensors.

The present invention also includes an apparatus and method of determining the density of frozen precipitation. To measure the density of frozen precipitation, the support structure includes a heating element configured to melt an accumulation of frozen precipitation. The heating element is connected to a microprocessor or to a switch so that the heating element may be powered on or off. After the frozen precipitation event has ended and the microprocessor determines the amount of frozen precipitation, electrical power is supplied to the heating element to melt the frozen precipitation. The microprocessor then determines the height of the liquid level in the support structure and determines the weight of the liquid by multiplying the height of the liquid by the cross-sectional area of the support structure that holds the liquid and then multiplying that product by the density of water. The equation for determining the weight of the water is height times the cross-sectional area times density of water equals the weight of water. The microprocessor next divides the calculated weight of the water by the product of the height of the frozen precipitation times the cross-sectional area of the support structure that holds the precipitation to determine the density of the frozen precipitation. Alternatively, the precipitation instrument can include a means for weighing the frozen precipitation. In that embodiment, the microprocessor determines the density of the precipitation by dividing the measured weight of the frozen precipitation by the product of the height of the frozen precipitation times the cross-sectional area of the support structure that holds the precipitation.

By providing a convenient and efficient means of determining the density of frozen precipitation, particularly snowfall, users of snow blowing equipment may be aided in operating snow blowing equipment at proper speeds. The present invention will allow manufacturers of snow blowing equipment to include settings on their snow blowing equipment that correlate to the density of snow.

BRIEF DESCRIPTION OF THE DRAWINGS

FIG. 2b is a sectional view of the precipitation gauge of the present invention illustrating another embodiment of the precipitation gauge shown in FIG. 2a.

FIG. 3 is a side view of a second embodiment of the precipitation gauge of the present invention.

FIG. 3a is a cross sectional view of the precipitation gauge of FIG. 3 taken along line 1-1.

FIG. 4 is a diagram illustrating the method of assigning a predetermined threshold value to each of the light sensor of the precipitation gauge.

FIG. 5 is a diagram illustrating the method of assigning four predetermined threshold values to each of the light sensor of the precipitation gauge.

DETAILED DESCRIPTION OF THE INVENTION

Figure 1:
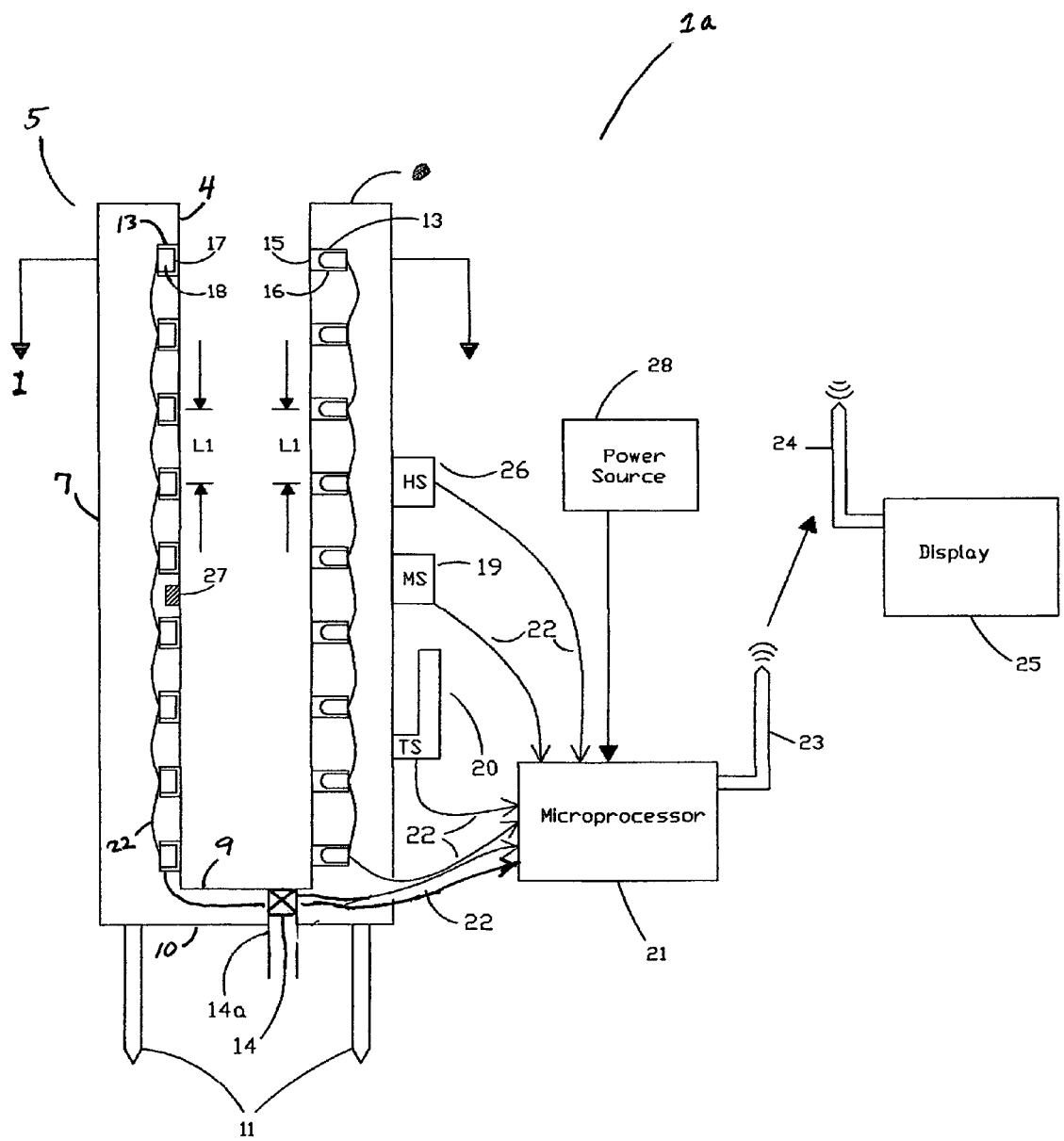
FIG. 1 is a partial sectional view and a schematic diagram that illustrates one embodiment of the precipitation gauge of the present invention.

One embodiment of the present invention is shown in FIG. 1. The precipitation gauge 1a includes a support structure 5, constructed out of metal, plastic or other suitable material, on which a plurality of light sources 16 and corresponding light sensors 18 are mounted in a vertical arrangement. Each of the light sources 16 are spaced a predetermined distance "$L_1$" from each adjacent light source 16. Each light sensor 18 is also spaced a predetermined distance "$L_1$" from each adjacent light sensor 18. The lowest light sensor 18 and the lowest light source 16 are placed a predetermined distance, preferably "$L_1$", above the inner bottom wall of the support structure 5. The distance between each light sensor 18 is preferably the same distance as is between each light source 16 but the two distances may be unequal. The support structure 5 may include projections or spikes 11 on the outer bottom wall 3 of the support structure 5 so that the apparatus may be secured to the ground. Alternatively, the support structure 5 may include a bracket (not shown) so that the support structure 5 may be mounted on another structure such as a fence, pole or house. The support structure 5 may also be weighted at the bottom portion to assist the support structure 5 in remaining upright.

Figure 2B:
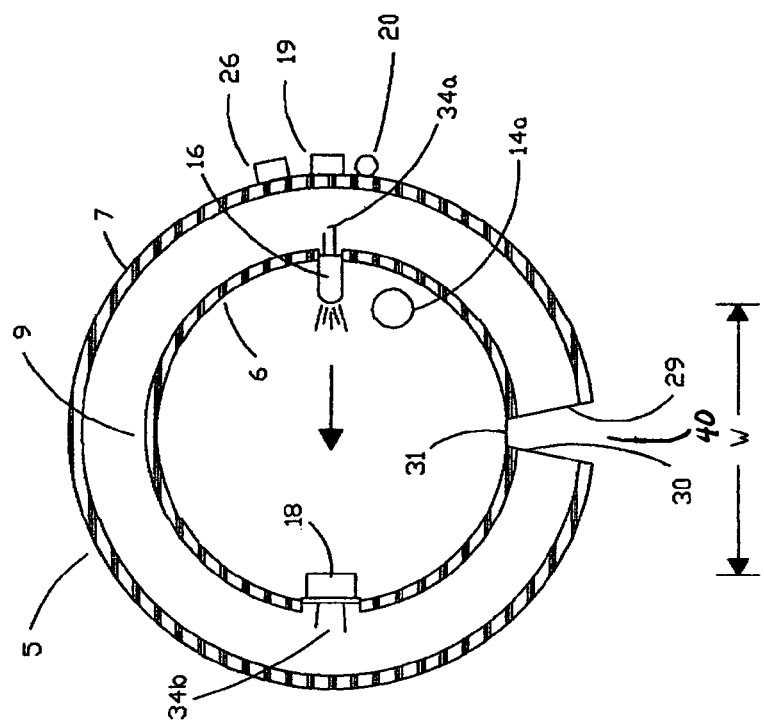
Figure 2A:
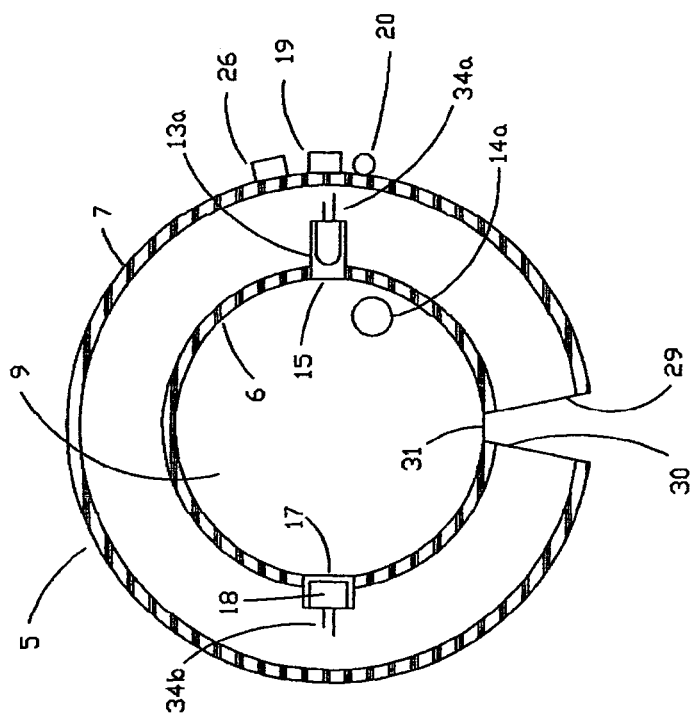
FIG. 2a is a sectional view of the precipitation gauge of FIG. 1 taken along line 1-1 illustrating the arrangement of the light sources and light sensors.

The support structure 5 shown in FIG. 1 is generally cylindrical in shape, having a generally cylindrical inner side wall 4 having opposed ends and a generally cylindrical outer side wall 7 having opposed ends. The support structure 5 is partially open at the top. A top wall 6 extends from the outer side wall 7 to the inner side wall 4 so that the volume between the inner and outer side walls 4, 7 is closed at the top. The lower end of the outer side wall 7 extends below the lower end of the inner side wall 4. A bottom outer wall 10 closes the lower end of the outer side wall 7. A bottom inner wall 9 closes the lower end of the inner side wall 4. The inner side wall 4 forms a cylinder and is open to receive precipitation. As frozen precipitation falls into the support structure 5, some of the frozen precipitation may stick to the inside surface of the inner side wall 4. Therefore, the inside surface of the inner side wall 4 may be coated with Teflon or other non-stick coating to help prevent the accumulation of frozen precipitation on the inside surface of the inner side wall 4 thereby allowing the frozen precipitation to fall to the bottom of the inner side wall 4 and accumulate upwardly. In addition to or alternatively, one or more solid state cooling devices, such as thermoelectric coolers, 12 may be placed on the support structure 5 to keep the inner side wall 4 at or below 32° F. which will help reduce the possible build up of frozen precipitation on the inside surface of the inner side wall 4. Preferably, the inner side wall 4 has an inside diameter of 0.25 to 36 inches, 1 to 12 inches and more preferably 2 to 8 inches. The distance between the light sensors 18 and light sources 16 is preferably about the same distance as the inside diameter of the inner side wall 4. It is understood that the support structure 5 can take many shapes and configurations. If the precipitation instrument is to be used to measure only frozen precipitation, the support structure 5 may be open and shown in FIGS. 3 and 3a. If the precipitation is to be used for rain, the support structure 5 may also comprise various shapes as long as the support structure is configured to receive and hold an amount of rain that is representative of the area adjacent to the support structure. For example, the support structure 5 may comprise a cylinder having only one cylindrical side wall having an open end and a closed end. The support structure 5 may also include a sight glass 40 with a measurement scale (not shown) so that the precipitation level may be verified by the user. As shown in FIGS. 2a and 2b, the sight glass 40 is formed by two opposed end walls 29, 30 connecting the inner side wall 4 and the outer side wall 7 and a section 31 of transparent material disposed in or forming a portion of the inner side wall 4. A measurement scale in inches, centimeters or other units may be placed on the section 31 of transparent material or adjacent end walls 29, 30 to allow manual reading of the amount of precipitation and to allow verification of the amount of precipitation determined by the precipitation instrument.

Because a cylinder may adversely affect the aerodynamics of the falling snow in the vicinity of the cylinder such that the snow which falls in the cylinder is not approximately the amount of snow falling in the area around the cylinder, an open support structure 5b may be employed as shown in FIGS. 3 & 3a if used only for frozen precipitation and if placed on the ground other flat area where frozen precipitation may accumulate. The open support structure 5b may be formed by flat bars 32 on a base 33. Alternatively, two rods or poles may form the support structure. The flat bars or rods may also include connectors (not shown) near the ends of the rods or flat bars to facilitate stacking of one or more flat bars or rods. The connectors may be male/female connectors or any other type of connector that will allow two or more rods or flat bars to be connected together. FIG. 3a shows a side view of the open support structure 5b comprised of two flat bars 32 disposed on a flat base 33. Light sources 16 and light sensors 18 are located a predetermined distance from each adjacent light sensor 18 in optical alignment with each other. The flat bars 32 may include clips for holding the light sources 16 and lights sensors 18. Each flat bar, clips and base may be molded from plastic as separate pieces or as one piece. Where is it desired to determine the level of frozen precipitation on streets, ski slopes or sidewalks, the support structure may comprise poles, including utility poles, which are spaced significant distances apart such as from about three feet to about 300 feet. Light sources which focus a beam of light such as lasers, may be needed where the distance between the light sources and light sensors is greater than about one foot.

As shown in FIG. 1, the light sources 16 are mounted on the support structure 5 at predetermined distances above the bottom of the support structure 5. The light sources 16 may be mounted inside of the cylindrical support structure 5 or through the inner side wall 4 of the support structure 5. If mounted through the inner side wall 4 of the support structure 5, the light sources 16 are mounted so that they emit light to a corresponding light sensor 18 mounted on the opposite side of the inner side wall 4. As snow or other frozen precipitation falls around the support structure 5 and accumulates, the frozen precipitation blocks at least a portion of the light emitted from the light sensors 18 so that the light sensors 18 receive less light from the light sources 16. Microprocessor 21 is connected to the light sensors 18 and light sources 16, receives an output signal from each of the light sensors 18 and compares the output signal with a predetermined threshold value to determine whether or not precipitation in the support structure 5 is covering one or more of the light sensors 18. The light sensors 18 may be connected to the microprocessor 21 in series so that the output signals from the light sensors 18 are added together and received by the microprocessor or connected in parallel so that the each output signal from each light sensor 18 is received by the microprocessor 21. After the microprocessor 21 compares the output signal of each light sensor 18 with its corresponding predetermined threshold value, the microprocessor 21 determines the level of precipitation in the support structure 5 and transmits a signal, either by wireless transmitter 23 or by wire to a receiver 24 on a display device 25. The display device 25 then displays the level of precipitation. The display device 25 may be incorporated into the microprocessor 21. The microprocessor 21 may be located at or near the support structure 5 or remotely such as in a building. If located remotely from the support structure 5, output signals from the light sensors 18 may be sent to the microprocessor 21 by wireless transmitter or by wire. The microprocessor 21 may be connected to the support structure 5 and have a wireless transmitter 23 so that the microprocessor 21 can communicate wirelessly with an electronic display device 25 located away from the support structure 5, such as indoors. In another embodiment, a wireless transmitter 23 may be attached to the support structure 5 for transmitting output signals from a light sensor or a plurality of light sensors 18 to a microprocessor 21 that is located away from the support structure 5. If the microprocessor 21 is not located at the support structure 5, a power source 28 must be provided for the electronic and electrical devices at the support structure 5. The microprocessor 21 may also communicate either by wireless transmitter 23 or by hardwire with a controller (not shown) for an irrigation system to effect changes to the controller based on the measurement of precipitation. For example, if the microprocessor 21 determines the presence of precipitation, the microprocessor 21 may delay, stop or change the controller's irrigation schedule. The microprocessor 21 may even act as an irrigation controller to open and close one or more valves on a predetermined schedule for predetermined periods of time.

Microprocessor 21 may be any device comprising an electronic component that receives one or more output signals, including but not limited to voltage, resistance or current, from a light sensor 18 and determines the presence or absence of precipitation from one or more output signals, performs mathematical calculations, and/or stores data in memory. The microprocessor 21 may also compare the output signal from the light sensor 18 with predetermined stored values. Thus, the microprocessor 21 can be a computer processor that is on an integrated circuit chip or a processor with memory and associated circuits or any electronic unit that can perform one or more predefined commands, including but not limited to receiving and comparing a voltage or current signal to another value, transmitting a signal to open or close a switch or assigning a value, such as a binary number based on a signal.

Power source 28 supplies power to the microprocessor 21 which in turn supplies power to the light sources 16 and light sensors 18. Alternatively, the power source 28 may power the light sources 16 and light sensors 18 directly. If the display device 25 is located remotely from the microprocessor 21, the display device 25 may be powered separately by battery or other power supply. After the precipitation event is over, the microprocessor 21 sends a signal to a control valve 14 placed in an opening 14a through the bottom inner wall 9 and a bottom outer wall 10 of the support structure 5 to open and drain the precipitation from the support structure 5 so that the next precipitation event may be measured. The control valve 14 may also be operated manually by a user. The support structure 5 may also include a heating element (not shown) to melt the frozen precipitation for draining through the control valve 14 so that subsequent frozen precipitation events can be measured. The heating element is preferably located near or on the inner side wall 4.

The support structure 5 may be made in segments so that the segments can be stacked on each other to form support structures of varying height to accommodate precipitation amounts usually seen in various parts of the country. Support structures that are open at the bottom may be stacked on other support structures to achieve a predetermined height. The support structures may be made in segments having predetermined lengths, such as 6, 12, 24 or 36 inches. The support structure 5 may include connectors (not shown), such as male/female connectors, at or near the tops and bottoms of the support structure to facilitate stacking of one or more support structures and to provide electrical connections so that the light sources 16 and/or the light sensors 18 will be connected to the microprocessor 21 or a wireless transmitter to transmit signals to the microprocessor 21.

In the embodiment shown in FIG. 1, twelve light sources 16 and twelve corresponding light sensors 18 are mounted in a vertical arrangement on the support structure 5. The lowest light source 16 and light sensor 18 are mounted one inch above the inside bottom wall of the support structure. The remaining light sensors 18 and light sources 16 are mounted on the support structure 5 at one inch intervals measured from the center axis of the light sources and light sensors. Preferably, there will be one light source 16 for each light sensor 18. It will be understood, however, that there may be one light source for two or more light sensors. For example, one light source may be used for two light sensors that are spaced one inch or less apart. Light sensors 18 may be placed every one-eight inch, one-quarter inch, or one-half inch on the support structure to achieve the desired accuracy or resolution of the amount of precipitation. The light sensors 18 may even be placed in a vertical arrangement such that light sensors contact adjacent light sensors. Similarly, light sources 16 may be placed every one-eight inch, one-quarter inch, or one-half inch on the support structure or placed in a vertical arrangement such that the light sources contact adjacent light sources.

The light sources 16 may be incandescent bulbs, fluorescent bulbs, LED's (light emitting diodes), lasers, including laser diodes, organic light emitting diode, or any other device that emits light. The light sources 16 can emit light of any wavelength for use with the present invention but preferably, the light sources 16 are selected to emit light a specific, narrow band of wavelength that is above or below the visible spectrum, such as infrared light to reduce interference from outside visible light. Although infrared is preferred, the light sources 16 may also be chosen to emit red, green, blue, violet or ultraviolet light to reduce interference from outside artificial or natural light. The light sensors 18 may be any light sensitive device that can provide an output signal in response to receiving light, including but not limited to photo diodes, photo resistors, photo transmitters, photo transistors, photo darlingtons, photo switches, transmissive switches, reflective switches, and solar cells and may also be a light sensor array or linear sensor array of closely spaced light sensor elements. Light sensors, including light sensor arrays or linear sensor arrays are available from Advanced Photonix, Inc. A filter 17 may be placed over the light sensors 18 to filter out light having wavelengths that might interfere with the light emitted from the light source 16 such as sunlight or street lights.

As shown in FIG. 1, the light sources 16 and light sensors 18 may be enclosed in individual housings 13 to protect the light sensors 18 and light sources 16 from the environment. The housings 13 are preferably made of plastic that may be molded when the support structure 5 is molded but may be metal or any other suitable material. The housings 13 for the light sources 16 may be cylindrical in shape and include small lenses 15 to focus the light on the corresponding light sensor 18. Placing the light sources 16 inside of housings 13 will reduce the amount of light that the light sensor 18 receives from a light source 16 other than the light sensor's corresponding light source.

A timing device or clock may be included so that the microprocessor 21, light sensors 18 and/or light source 16 operate during predetermined time periods. The timing device or clock may be an internal function of the microprocessor 21 that can be programmed to activate the microprocessor 21, the light sensors 18 and/or the light sources 16. The microprocessor 21, light sensors 18, and/or light sources 16 may also be activated or control by temperature sensor 20, moisture sensor 19, and/or a humidity sensor 26. For example, if used only to measure frozen precipitation, the microprocessor 21, light sensors 18 or light sources 16 may be powered when the temperature sensor 20 measures the ambient air temperature at some predetermined temperature such as 35° F. Upon sensing a predetermined temperature, the temperature sensor 20 activates a switch to power the microprocessor 21, light sensors 18 and light sources 16. In one embodiment, the microprocessor 21 reads the temperature sensor 20 once every week at temperatures above 80° F., once every day at temperatures above 60° F., once every 12 hours at temperatures above 50° F. degrees and every hour at temperatures below 40° F. When the outside temperature reaches 35° F., the light sensors 18 and light sources 16 may be turned on. The control of the temperature sensor 20 may be manually overridden. The microprocessor 21 may also include a clock and/or a calendar so that the instrument may use the calendar to obtain dates when the precipitation gauge is activated to measure frozen precipitation. The temperature sensor 20, moisture sensor 19 and/or the humidity sensor 26 may also be used in combination with a calendar to control or activate the microprocessor 21, light sensors 18 or light sources 16. For example, during the months of October through April, once the outside temperature reaches 35° F. or below and the moisture sensor 19 detects moisture, the microprocessor 21 activates the light sources 16 and light sensors 18 and begins reading the output signal of each light sensor 18 as described below.

LEDs or other inexpensive sources of light do not emit perfectly collimated light as do lasers. As a result, a light sensor may not simply provide one signal with no snow obstruction and another signal with snow obstruction. The signal should change as the combined total of all sources of light are obstructed, reflected or scattered. Therefore, if LEDs or other inexpensive light sources are used, the light is preferably focused on the light sensor or light sensors. Optionally, the light source or light sources may be modulated so that the effect of light from sources other than the light source will be reduced or eliminated. The light source may be modulated (turned on and off at some frequency, which can be Hz to MHz and higher) and the receiver/sensor may be set to the same frequency and tuned-in to the same timing (e.g., the time at which the max light comes off the emitter is when the sensor is set to receive the signal). This technique allows other sources of light such as background light (or if working with electrical devices, filter out DC current). A method and apparatus for modulation is disclosed in a technical bulletin published by Hamamatsu, "Characteristic and use of Light modulation photo IC," June 2002 and is incorporated herein by reference.

As shown in FIG. 4, each light sensor 18 is assigned a predetermined threshold value. The predetermined threshold value may be determined by selecting a value that is a percentage or fraction of the maximum output of the light sensor, such as 40, 50, 60, 70, 80, or 90 percent of the maximum output. For example, if the maximum output of a light sensor 18 is 20 micro amps, then the predetermined threshold value may be 18, 16, 14, 12, 10, or 8 micro amps. In another embodiment, the predetermined threshold value may be determined by placing a light sensor and light source at a predetermined distance and measuring the output of the light sensor. The predetermined threshold value may be any percentage of that output. Referring to FIG. 1, the predetermined threshold value is preferably determined after the light sensors 18 and light sources 16 are mounted on the support structure 5. The output signal from the light sensors 18 is measured with no precipitation present. Shaved or crushed ice or a similar material is then gradually placed in the support structure 5 either continuously or in incremental amounts between the light sensors 18 and light sources 16 and the output signal of each light sensor 18 is measured just as the level of material has covered the light sensor. The predetermined threshold value of each light sensor is based on the output signal of the light sensor 18 at the time that the light sensor is just covered with the material. Therefore, the predetermined threshold value can be the output signal of the light sensor 18 at the time that the light sensor 18 is just covered with the material or a predetermined fraction of that output signal, such as about 0.95, 0.9, 0.85, 0.8, 0.75, or 0.7, 0.65, 0.6, 0.55, 0.5, 0.45, 0.4, 0.35, 0.3, 0.25, 0.2, 0.15, 0.1. The threshold value should be chosen to reduce or eliminate possibility that the microprocessor will determine that precipitation has accumulated between a light sensor and a light source when falling precipitation is blocking a fraction of the light from reaching the light sensor thereby reducing the output signal of the light sensor.

Alternatively, each light sensor 18 may be assigned two or more different predetermined threshold values. FIG. 5 shows an embodiment wherein each light sensor 18 is assigned four different predetermined threshold values. The first predetermined threshold value for each light sensor 18 is less than the second predetermined value, which is less than the third predetermined value, which is less than the fourth predetermined value. For example, threshold value no. 5 for the sensor no. 2 shown in FIG. 5 is less that threshold value no. 6. Threshold value no. 6 is less than threshold value no. 7. Threshold value no. 7 is less than threshold value no. 8. FIG. 5 shows a sensor scheme where the output signal from each light sensor 18 will be checked against four threshold values and each of the results will be given an "1" or an "0" binary number, representing a level corresponding to the predetermined level of each of the threshold values. Each of the binary numbers would represent one-fourth of the vertical distance between each of the sensors. Alternatively, each light sensor may be checked against two, three, five, six or more threshold values.

Figure 6:
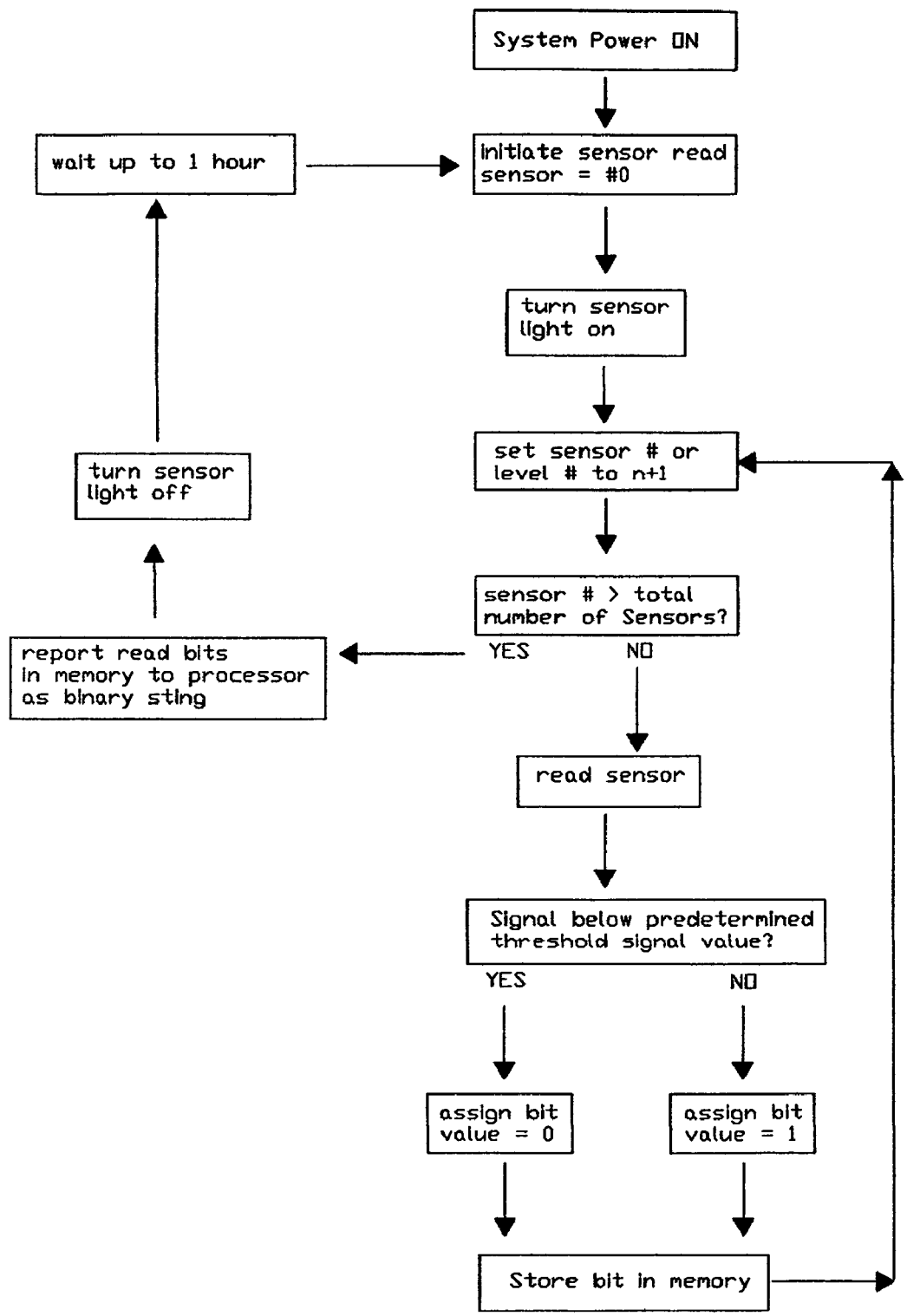
FIG. 6 is a flow chart illustrating a method for reading the output signal for each light sensor and assigning a binary number for each light sensor.
Figure 7:
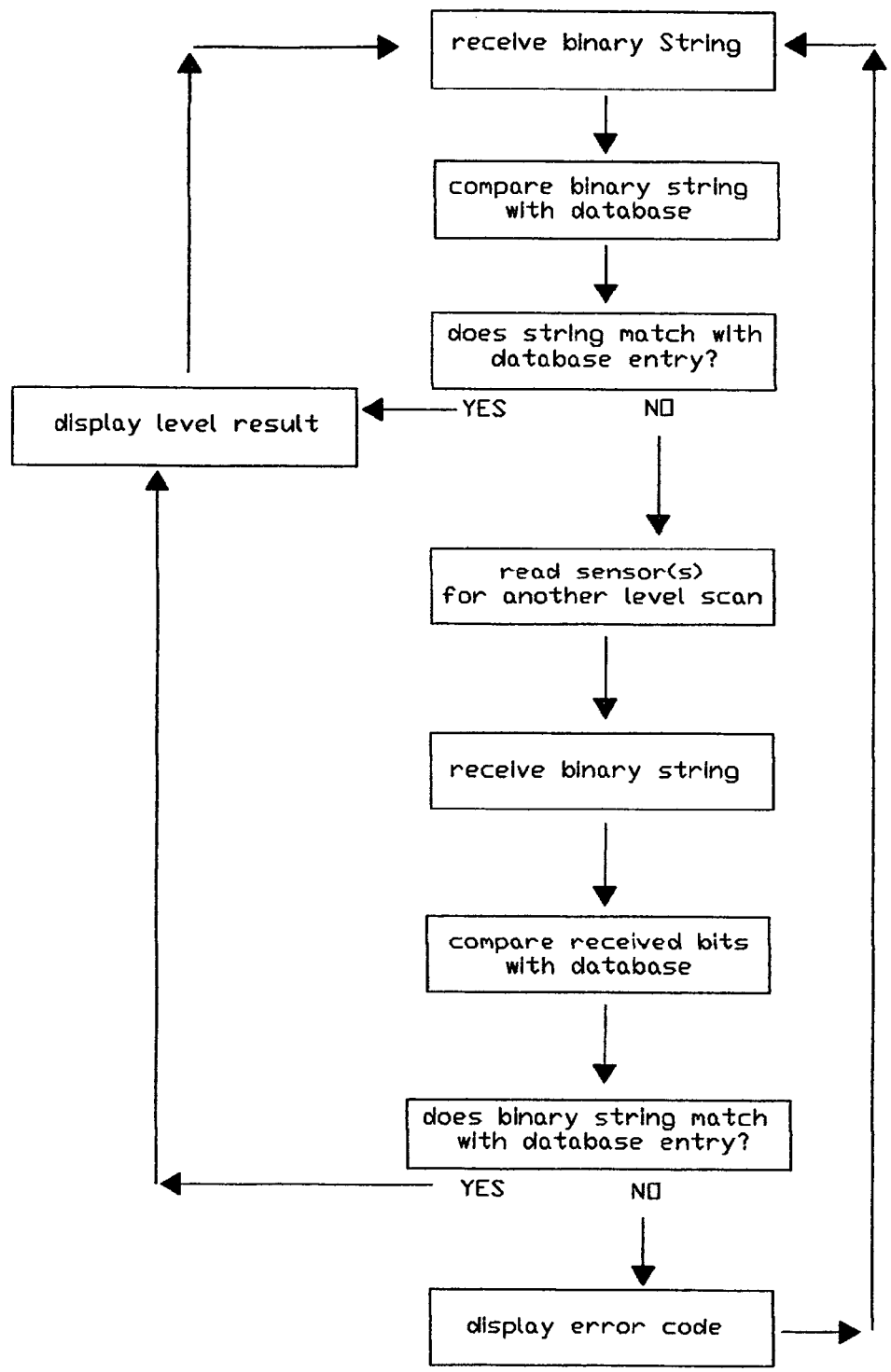
FIG. 7 is a flow chart illustrating a method for determining the level of precipitation by the precipitation gauge of the present invention.

FIGS. 6 and 7 are logic flow diagrams that the microprocessor 21 may follow to determine whether or not precipitation is present between the light sensor 18 and a corresponding light source 16. In the embodiment shown in FIG. 6, the microprocessor 21 checks the output signal, such as current or voltage of each light sensor against one or more predetermined threshold values for each light sensor. The microprocessor then assigns a "0" or a "1" binary number to each light sensor 18 based on the output signal of the light sensor 18. If the microprocessor 21 receives the output of a light sensor 18, compares that output to the predetermined threshold value, and determines that the output is less than to the predetermined threshold value, then the light sensor will be assigned a "1" binary number indicating that precipitation is present between the light sensor that was checked and the light sensor's corresponding light source. If the microprocessor 21 receives the output of a light sensor, compares that output to the predetermined threshold value, and determines that the output is greater than or equal to the predetermined threshold value, then the light sensor 18 will be assigned a "0" binary number indicating that precipitation is not present between the light sensor 18 that was checked and the light sensor's 18 corresponding light source 16. The lower the predetermined threshold value that is used, the lower the likelihood that the microprocessor 21 will incorrectly assign a "1" binary number when precipitation is not present between the light sensor 18 and corresponding light source 16. It will be understood that the microprocessor 21 can assign a "0" instead of a "1" indicating that frozen precipitation is present between the light sensor 18 and corresponding light sensor and a "1" instead of a "0" indicating that frozen precipitation is not present between the light sensor 18 and corresponding light source 16.

After the microprocessor 21 reads the output signal from each light sensor 18, compares each output signal to the predetermined threshold value and assigns a "1" or a "0" to generate a binary number string (such as 1 1 0 0 0 0 0 0 0 0 0), as shown in FIG. 7 the microprocessor 21 compares the binary number to the Database for Accumulation of Precipitation. See Table 1 below. If the binary number matches a binary number in the Database for Accumulation of Precipitation, the microprocessor 21 displays the corresponding level of precipitation. If the binary number does not match a binary number in the Database, then the microprocessor 21 reads the output signal from each sensor, compares the output signal to the predetermined threshold value and assigns a "1" or "0" as described above which generates a binary number string comprised of 1's and 0's. The microprocessor 21 compares the binary number string to the Database. If the binary number string matches the Database (or binary number string in the Database), the microprocessor 21 displays the corresponding level of precipitation. If there is no match, then the microprocessor 21 displays an error code. The error code may alert the user to clean the light sensors 18 and light sources 16. In a preferred embodiment, the microprocessor 21 scans every sensor in predetermined cycles, such as every one minute, ten minutes, thirty minutes, or one hour. The microprocessor 21 will assign a binary number, "1" (or "off") or "0" (or "on"), to each light sensor 18 so that the total scan of all light sensors 18 will represent a binary number string, the total size of that number string being determined by the number of light sensors 18 on the support structure 5. This number will then be compared to a predetermined database of numbers that represent a given level of accumulation.

The operation of the microprocessor 21 can be further illustrated by reference to FIG. 1 which shows the embodiment having twelve sensors, each of which are spaced vertically one-inch apart on the support structure 5 and are set to a single threshold value. The predetermined database will have the following twelve binary number strings which represent the amount of precipitation that may be present;

TABLE 1

Microprocessor Database

| Database for Accumulation of Precipitation | Corresponding Precipitation Level |
|---|---|
| 000000000000 | 0 unit |
| 100000000000 | 1 units |
| 110000000000 | 2 units |
| 111000000000 | 3 units |
| 111100000000 | 4 units |
| 111110000000 | 5 units |
| 111111000000 | 6 units |
| 111111100000 | 7 units |
| 111111110000 | 8 units |
| 111111111000 | 9 units |
| 111111111100 | 10 units |
| 111111111110 | 11 units |
| 111111111111 | 12 units |

If, for example, the microprocessor reads the first, second and third light sensors 18 (counting from the bottom of the support structure) as having an output less than the predetermined threshold value, the microprocessor 21 assigns a value "1" to those three sensors. If the microprocessor 21 reads the remaining nine light sensors 18 as each having outputs greater than or equal to their respective predetermined threshold values, then the microprocessor 21 will assign each of the remaining seven sensors a value of "0". The microprocessor 21 will then compare the bit values of all of the sensors which comprise a binary string or sequence (e.g. 1 1 1 0 0 0 0 0 0 0 0 0) to a binary number strings in its memory to find a match and then provide an output signal to a display device of "3 inches" thereby representing three inches of precipitation. The resolution of the precipitation gauge can be increased by placing sensors closer together, such as every one-half or one-quarter inch apart, then the apparatus can determine the amount of precipitation to the nearest one-half inch or one-quarter inch respectively. It will be understood that the measurement can be provided in other units such as millimeters or centimeters.

Alternatively, a correlation, such as an equation or formula, may be generated that provides the relationship between the amount or level of frozen precipitation in the support structure 5 and the output signals of the light sensors 18 by measuring the output signals of the light sensors 18 as shaved ice, crush ice, or similar material is gradually placed in the support structure either continuously or in incremental amounts and correlating the output signals of the light sensors 18 with the level of material in or around the support structure. If the light sensors 18 are connected in series to the microprocessor 21, the microprocessor 21 with read the total of the output signals of the light sensors 18. If the light sensors 18 are connected in parallel, the microprocessor 21 will read each output signal from each light sensor 18. If the support structure 5 is a closed cylinder, the precipitation device can also measure rainfall. When rain water collects in the cylinder formed by the inner side wall 4 between the light sensors 18 and light sources 16, the water will refract and scatter the light from the light sources 16 so that the light sensors 18 will receive less light and will output a lower signal. This output signal will be greater than the signal if frozen precipitation is present in the support structure 5. Thus, a predetermined threshold value for rain water may also be determined experimentally by gradually adding water to the support structure either continuously or in incremental amounts and measuring the output signal of each of the light sensors 18 either continuously or at predetermined levels of water to generate a correlation between the amount of water in the support structure and the output signal from the light sensors 18. The microprocessor 21 may be programmed to read the output signals from the light sensors 18 and compare the output signals to predetermined threshold values for rain water. If the output signal from a light sensor 18 is less than the threshold value for rain water but greater than the threshold value for frozen precipitation and if the temperature is above 32° F., then the microprocessor will report the rainfall amount.

Because the light sensors 18 and light sources 16 will become coated with a dirt film and other small particles over time, the microprocessor 21 may scan each of the light sensors 18 when precipitation is not present and compare the outputs of the light sensors 18 with a baseline output signal for each light sensor 18 that was obtained when the precipitation gauge was first turned on or a baseline that is stored in the microprocessor 21. If the output signal of the light sensor 18 varies by more than a predetermined amount from the baseline value, then the microprocessor 21 sends a signal to the display device to advise the user to clean the light sensors 18 and light sources 16.

Figure 8:
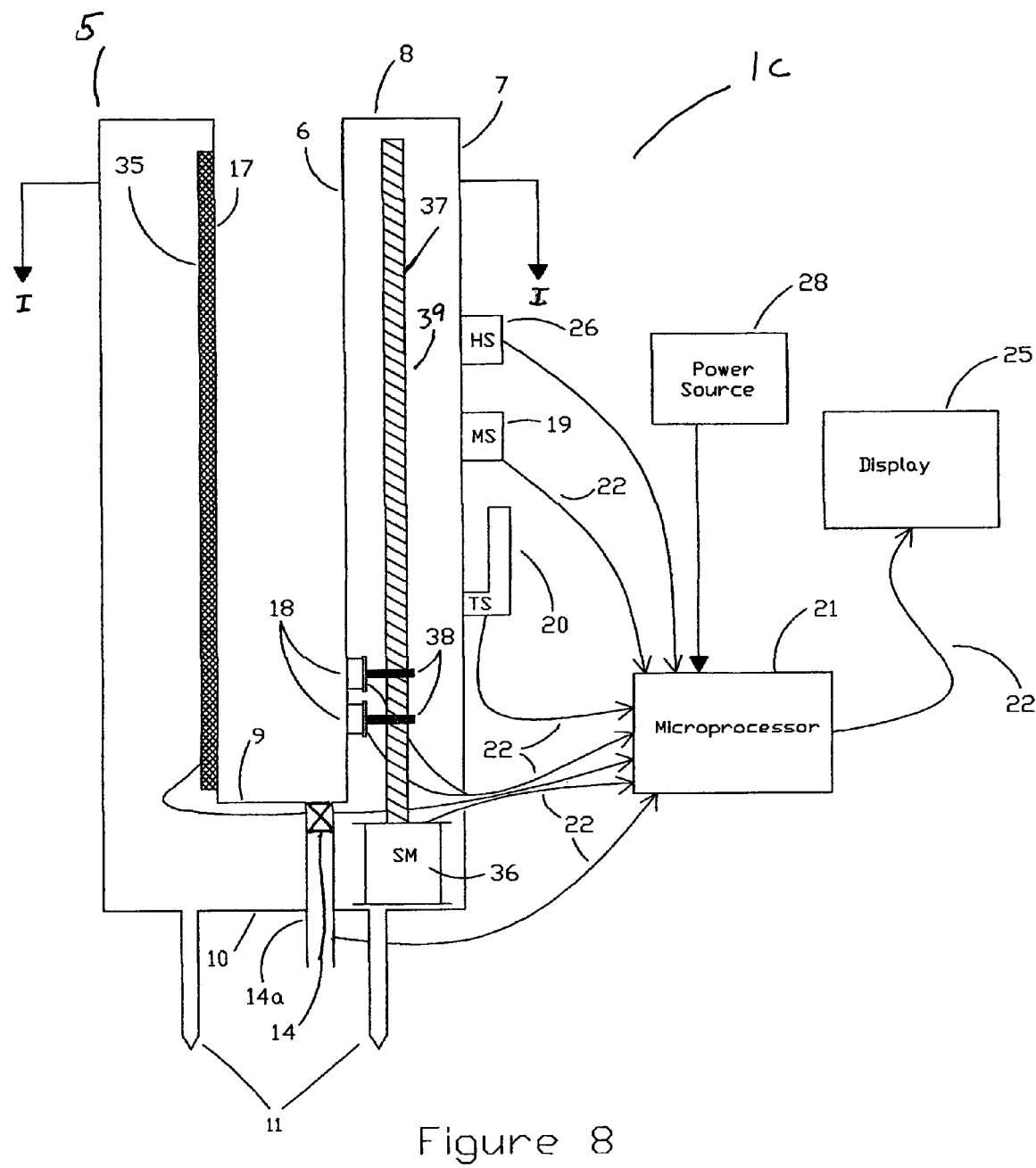
FIG. 8 is a partial sectional view and schematic diagram that illustrates a third embodiment of the precipitation gauge of the present invention.
Figure 9:
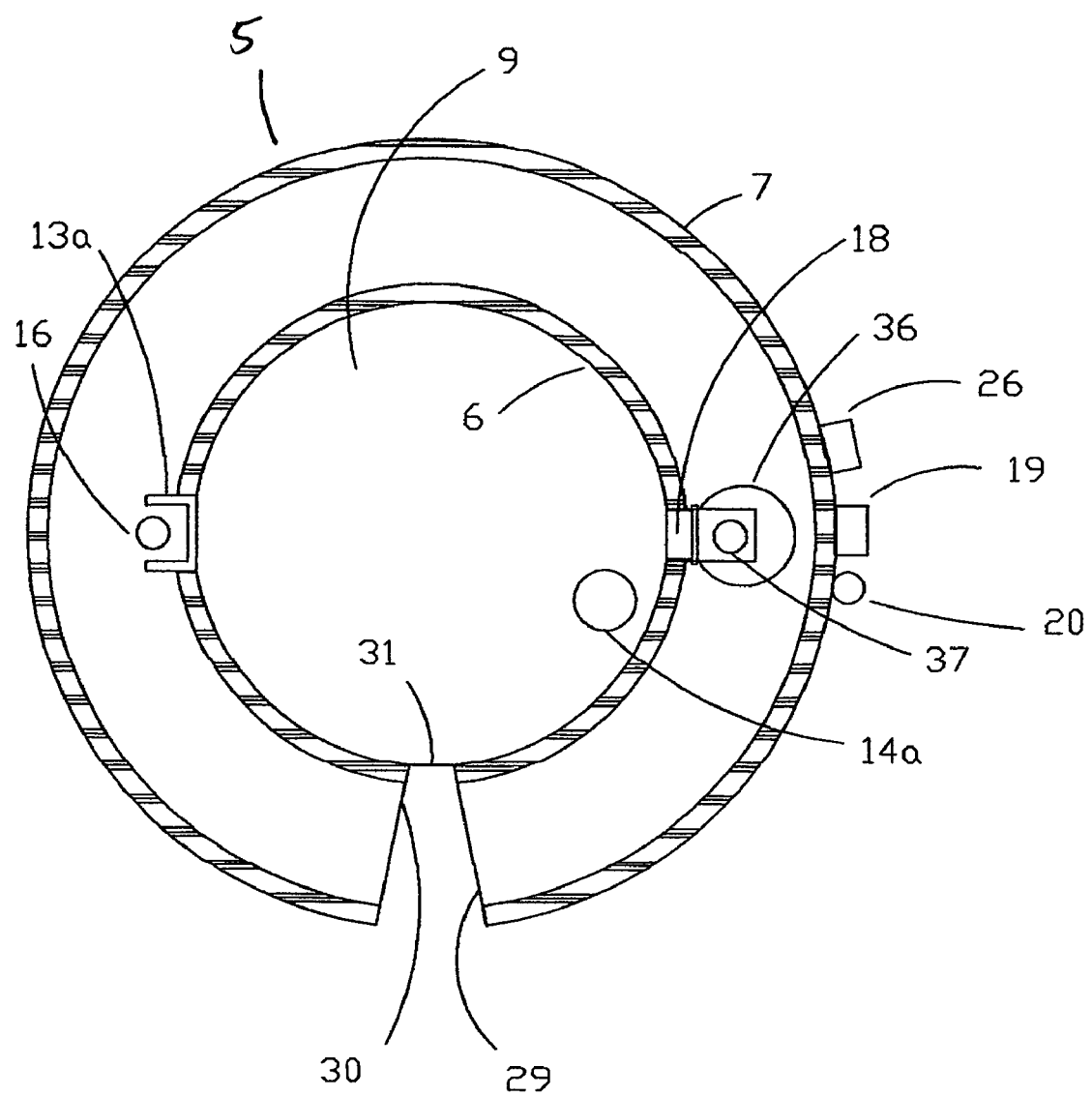
FIG. 9 is a sectional view of the precipitation gauge of FIG. 8 taken along line 1-1.

FIGS. 8 and 9 illustrate another embodiment 1c of the present invention. Instead of a plurality of light sources, a single light source 16 preferably extends the entire height or substantially the entire height of the portion of the support structure 5 that is configured to hold precipitation. It is understood, however, that the single light source 16 may extend at least about 10 percent, 20 percent, 30 percent, 40 percent, 50 percent, 60 percent, 70 percent, 80 percent or 90 percent of the entire height of the portion of the support structure 5 that is configured to hold precipitation, i.e., the inner side wall 4. Opposite the light source 16 are first (lower) and second (upper) light sensors 18a, 18b mounted by pins 38 on a shaft 37 of a linear translation device 39. The linear translation device 39 comprises a motor 36 and the shaft 37. The motor 36 may be a servo motor, a stepper motor, or other motor that can rotate the shaft 37. The light source 16, linear translation device 39, and the lower and upper light sensors 18a, 18b are connected to a microprocessor 21 so that the microprocessor may communicate with light source 16, lower and upper light sensors 18a, 18b linear translation device 39. The microprocessor 21 receives output signals from the lower and upper light sensors 18a, 18b and the linear translation device 39. The microprocessor 21 also receives output signals from a moisture sensor 19, temperature sensor 20 and humidity sensor 26. As previously described, the microprocessor 21 may use output signals from the temperature sensor 20, humidity sensor 26, or moisture sensor 19 or any two or any three of the sensors to determine when to power the light source 16 and lower an upper light sensors 18a, 18b and to begin reading the output signals from the lower and upper light sensors 18a, 18b. The microprocessor 21 determines whether to use the predetermined threshold value for snow or water based on the temperature provided by the temperature sensor 20. If the temperature is 32° F. or below, the microprocessor 21 uses the predetermined threshold value for snow. If the temperature is greater than 32° F., the microprocessor uses the predetermined threshold value for water. The microprocessor's selection of the predetermined threshold value is capable of being overridden by the user. The microprocessor 21 may include a switch or a button that allows the user to select rain or snow so that the instrument will measure rainfall or snowfall as selected by the user. The lower light sensor 18a is closely spaced to the upper light sensor 18b. For example the distance between the lower and upper sensors 18a, 18b is preferably between 0.005 and 0.5 inches and more preferably 0.01 and 0.1 inches. Alternatively, the sides of lower and upper sensors 18a, 18b may touch each other. The linear translation device 39 is capable of moving the light sensors 18a, 18b upwardly or downwardly either continuously or in discrete increments or distances in response to commands or signals from the microprocessor 21. The microprocessor 21 controls the linear translation device 39 so that the motor 36 rotates the shaft 37 and moves the attached lower and upper light sensors 18a, 18b upwardly or downwardly until the output signal from the upper sensor 18b is greater than a predetermined threshold value and the output signal from the lower sensor 18a is less than or equal to a predetermined threshold value, which would indicate that the level of precipitation in the support structure 5 is between the lower light sensor 18a and upper light sensor 18b. When the output signal from the upper light sensor 18b is greater than the predetermined threshold value and the output signal from the lower light sensor 18a is less than or equal to a predetermined threshold value, the microprocessor 21 obtains the vertical position of the light sensors 18a, 18b and determines that the level of precipitation is between the lower and upper light sensors 18a, 18b. The vertical position of the light sensors 18a, 18b may be based on the centerline of the pins 38 which attach the light sensors 18a, 18b to the shaft 37. The microprocessor is programmed to determine the level of precipitation by adding half of the distance between the centerline pins 38 to the height of the lower sensor 18a or subtracting half of the distance between the centerline of the pins 38 from the height of the upper sensor 18b. Alternatively, the microprocessor 21 may be programmed to determine the level of precipitation by obtaining the position of the midpoint between the centerlines of the pins 38. The microprocessor 21 may make a small adjustment to the level of precipitation may be made to account for the meniscus of the water because the water level should be determined at the bottom most point of the curved shape that water assumes in a cylinder, not the top of the water level at the inner side wall 4.

After the rain or snow mode is determined, the microprocessor 21 receives an output signal from the light sensors 18a, 18b and compares the output signal to the predetermined threshold value for snow or water based on the temperature reading from the temperature sensor 20. Before beginning the process of determining amount of precipitation, the linear translation device 39 initially positions the light sensors 18a, 18b at the bottom of the portion of the support structure 5 at or near the bottom of the inner side wall 4. The microprocessor 21 receives output signals from the lower and upper light sensors 18a, 18b and compares the output signals to a predetermined threshold value which is determined as described above. If the output signals of the light sensors 18a, 18b are greater than the predetermined threshold value, the microprocessor 21 determines that precipitation is not present between the light sensors 18a, 18b and the light source 16 and sends a signal to the display 25 indicating zero level of precipitation.

The microprocessor 21 then sends a signal to the linear translation device 39 to move the light sensors 18a, 18b downwardly a predetermined distance. If the output signals of the light sensors 18a, 18b are less than or equal to the predetermined threshold value, the microprocessor 21 obtains the position of the light sensors 18a, 18b from the linear translation device 39 and determines that precipitation is between the light sensors 18a, 18b and the light source 16. The microprocessor 21 then sends a signal to the linear translation device 39 to move the light sensors 18a, 18b upwardly a predetermined distance. After signaling the linear translation device 39 to move the light sensors 18a, 18b upwardly or downwardly, the microprocessor 21 receives output signals from the light sensors 18a, 18b and compares the output signals to their predetermined threshold values. If the output signals of the light sensors 18a, 18b are greater than the predetermined threshold value, then the microprocessor 21 determines that precipitation is not between the light sensors 18a, 18b and sends a signal to the linear translation device 39 to move downwardly a predetermined distance. If the output signals of the light sensors 18a, 18b are less than or equal to the predetermined threshold value, then the microprocessor 21 determines that precipitation is between the light sensors 18a, 18b and sends a signal to the linear translation device 39 to move upwardly a predetermined distance. The microprocessor 21 continues to receive output signals from the light sensors 18a, 18b and signals the linear translation device 39 to move the lights sensors 18a, 18b until output signal from the upper light sensor 18b is greater than a predetermined threshold value and the output signal from the lower light sensor 18a is less than or equal to the predetermined threshold value at which time the microprocessor 21 determines that the level of precipitation is at the height between the light sensors 18a, 18b. The microprocessor 21 sends a signal to the display device 25 to display the amount of precipitation. The microprocessor 21 continues this process until a predetermined time period transpires without change in level of precipitation.

Optionally, only one light sensor 18 can be used with the apparatus 1c shown in FIGS. 8 and 9. If one light sensor is used; for example if only light sensor 18a or 18b is present, then the microprocessor 21 will read the output signal from the light sensor and compare the output signal to a predetermined threshold value. If the output signal is greater than the predetermined threshold value, the microprocessor will determine that precipitation is not present between the light sensor 18a or 18b and will signal the linear translation device 39 to move downwardly a predetermined distance. If the output signal is less than or equal to the predetermined threshold value, the microprocessor will determine that precipitation is not present between the light sensor 18a or 18b and will signal the linear translation device 39 to move upwardly a predetermined distance. The microprocessor 21 continue to receive output signals and compare output signals to a predetermined threshold value until the microprocessor receives an output signal that is less than the predetermined threshold value, sends a signal to the linear translation device to move the light sensor upwardly a predetermined distance, such as a tenth of an inch, and then receives an output signal that is greater than or equal to the predetermined threshold value. The microprocessor 21 will determine that the level of precipitation is at the height of the top of the light sensor when the output signal from the light sensor was less than or equal to the predetermined threshold value. The microprocessor 21 displays or send a signal to display the amount of precipitation. The microprocessor 21 continues to receive the output signal from the light sensor 18a or 18b to determine the amount of precipitation as the precipitation continues to fall. The microprocessor 21 continues this process until a predetermined time period transpires without change in level of precipitation. It will be understood that the output signal while the output signal has been described as being compared to the predetermined threshold value to determine whether the output signal is greater than the predetermined threshold value, the output signal may be compared to the predetermined threshold value to determine whether it is greater than or equal to the predetermined threshold value. Similarly, It will be understood that the output signal while the output signal has also been described as being compared to the predetermined threshold value to determine whether the output signal is less than or equal to the predetermined threshold value, the output signal may be compared to the predetermined threshold value to determine whether it is less than the predetermined threshold value.

Figure 10:
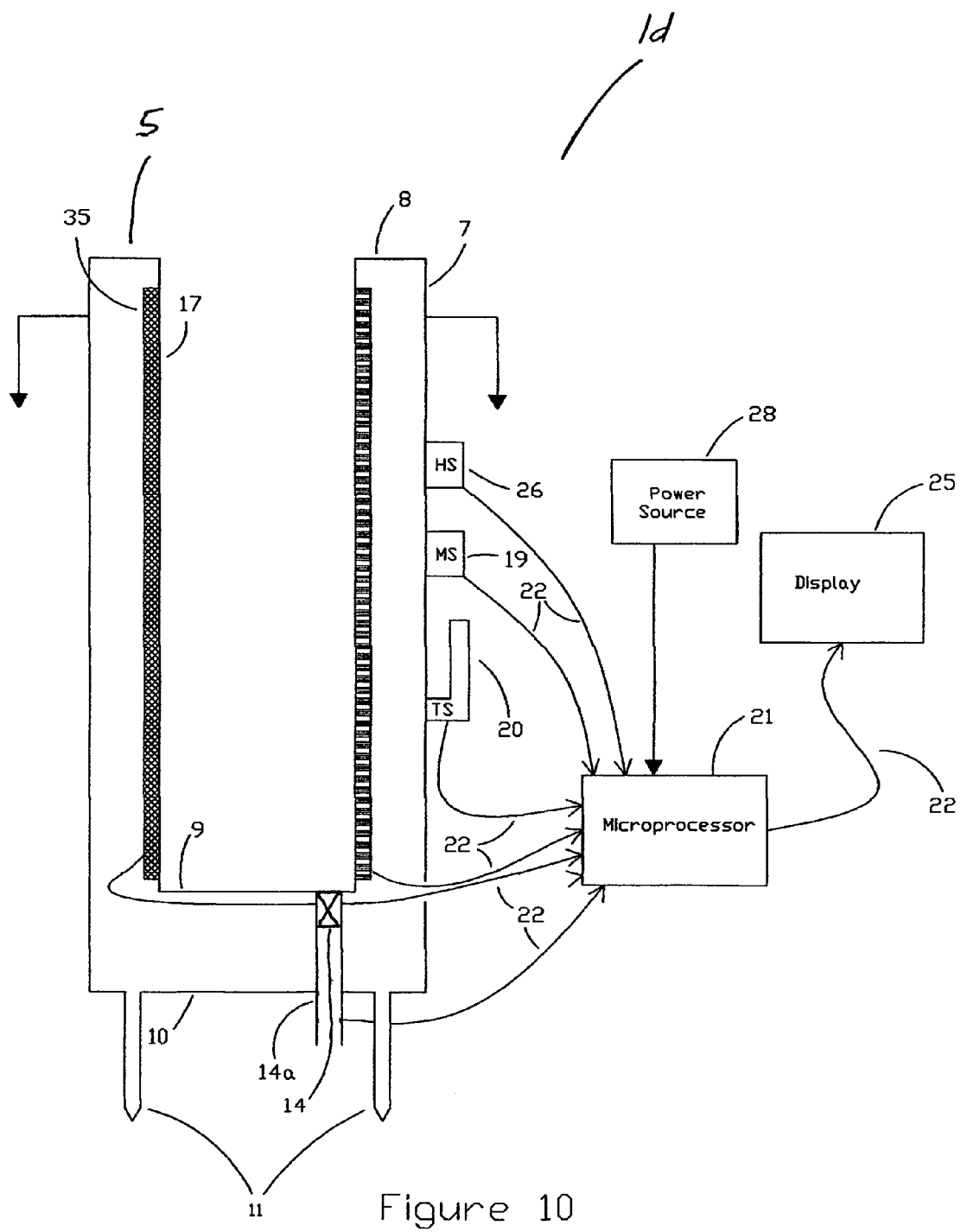
FIG. 10 is a partial sectional view and schematic diagram that illustrates a fourth embodiment of the precipitation gauge of the present invention.
Figure 11:
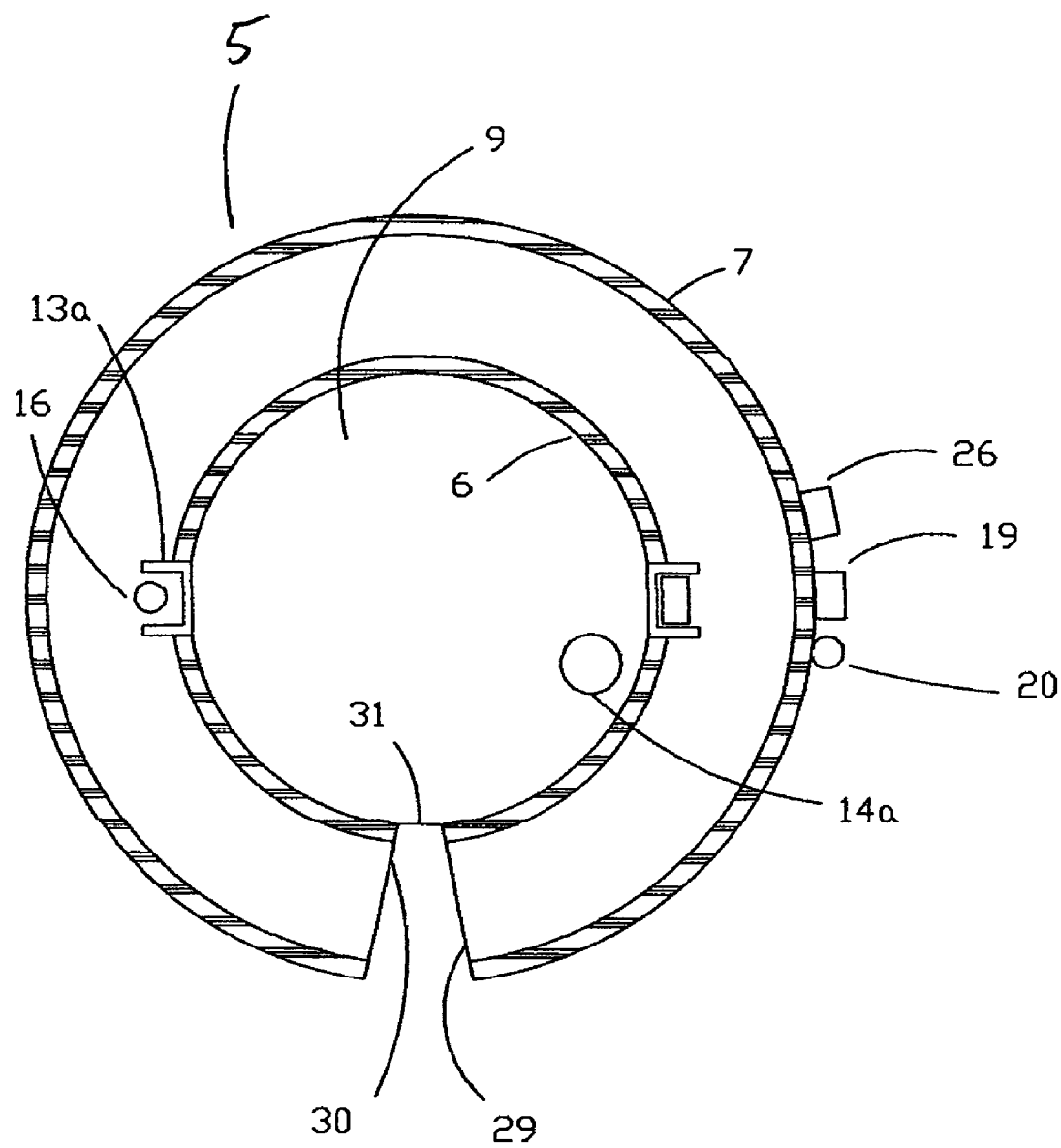
FIG. 11 is a sectional view of the precipitation gauge of FIG. 10 taken along line 1-1.

FIGS. 10 and 11 show another embodiment of the apparatus 1d of the present invention. A generally elongated light sensor 18 is located at or near the outside surface of the inner side wall 4 and extends the entire height or substantially the entire height of the inner side wall 4 of the support structure 5. Alternatively, the light sensor 18 may be located at or near the inside surface of the inner side wall 4 or may be incorporated in the inner side wall 4. The light sensor 18 may comprise a light sensor array or linear sensor array either of which comprising one or more light sensor elements. It is understood, however, that the single light sensor 18 may extend at least about 10 percent, 20 percent, 30 percent, 40 percent, 50 percent, 60 percent, 70 percent, eighty percent or 90 percent of the entire height of the inner side wall 4. The light sensor 18 array may be attached to or incorporated in the inner side wall 4. A light source 16 is located generally opposite the light sensor 18 so that the light sensor 18 may receive light from the light source 16. While the light sensor 18 preferably also extends the entire height or substantially the entire height of the inner side wall 4 of support structure 5, the light source 16 must be only of the size and intensity to provide sufficient light to the light sensor 18 so that precipitation can be detected between the light sensor 18 and the light source 16. The single light source 16 may, therefore, extend at least about 10 percent, 20 percent, 30 percent, 40 percent, 50 percent, 60 percent, 70 percent, eighty percent or 90 percent of the entire height of the inner side wall 4. The light source 16 is located generally opposite the light sensor 18, preferably behind a transparent section in the inner side wall 4. Alternatively, the light source 16 may be molded or disposed in the inner side wall 4. The light sensor 18 is placed so that it extends completely or partially through the inside the inner side wall 4 if adequately protected from the weather by, for example, a housing. The light sensor 18 is connected to the microprocessor 21. The light sensor 18 may be powered by the microprocessor 21 or a separate power source 28. As precipitation falls into the cylinder formed by the inner side wall 4, the precipitation blocks, refracts, and/or absorbs light emitted from the light source 18 so that less light reaches the light sensor 18. In response to receiving less light, the output signal of the light sensor 18 decreases in magnitude. The microprocessor 21 reads the output signal of the light sensor 18 at predetermined time intervals and uses a correlation in the microprocessor's memory to determine the level of precipitation in the support structure 5. After reading the output signal of the light sensor 18, and using the output signal in the correlation, the microprocessor 21 determines the level of precipitation and sends a signal to a display device 25 which then displays the precipitation in predetermined units such as inches. The microprocessor 21 may be located at the support structure 5 and transmit the level signal to a wireless receiver 24 on the display by wireless transmitter 23 or may transmit the signal by wire (not shown). Alternatively, the microprocessor 21 may be located remotely from the support structure 5. A wireless transmitter (not shown) located at the support structure 5 may transmit the light sensor 18 array output signal to the microprocessor 21.

The correlation for water may be generated by filling the volume within the inner side wall 4 with water in small increments, such as 1/16, 1/8 or 1/4 inch and measuring the output signal of the light sensor 18 at each 1/16, 1/8, or 1/4 inch increment until the level of water reaches the top of the inner side wall 4 or the top of the light sensor 18. Alternatively, the database for water may be generated by gradually filling the volume within the inner side wall 4 and measuring the output of the light sensor 18 either continuously or at predetermined time intervals until the level of water reaches the top of the inner side wall 4 or the top of the light sensor 18. The procedure can be repeated using shaved or crushed ice to generate the database for frozen precipitation. Preferably, the light sensor 18 emits light in the infrared wavelength (greater than about 750 nm). A filter 17 may be placed over the light sensor 18 to filter out wavelengths of light outside of the infrared wavelength to reduce the effect of light from sources other than the light source 16.

Figure 12:
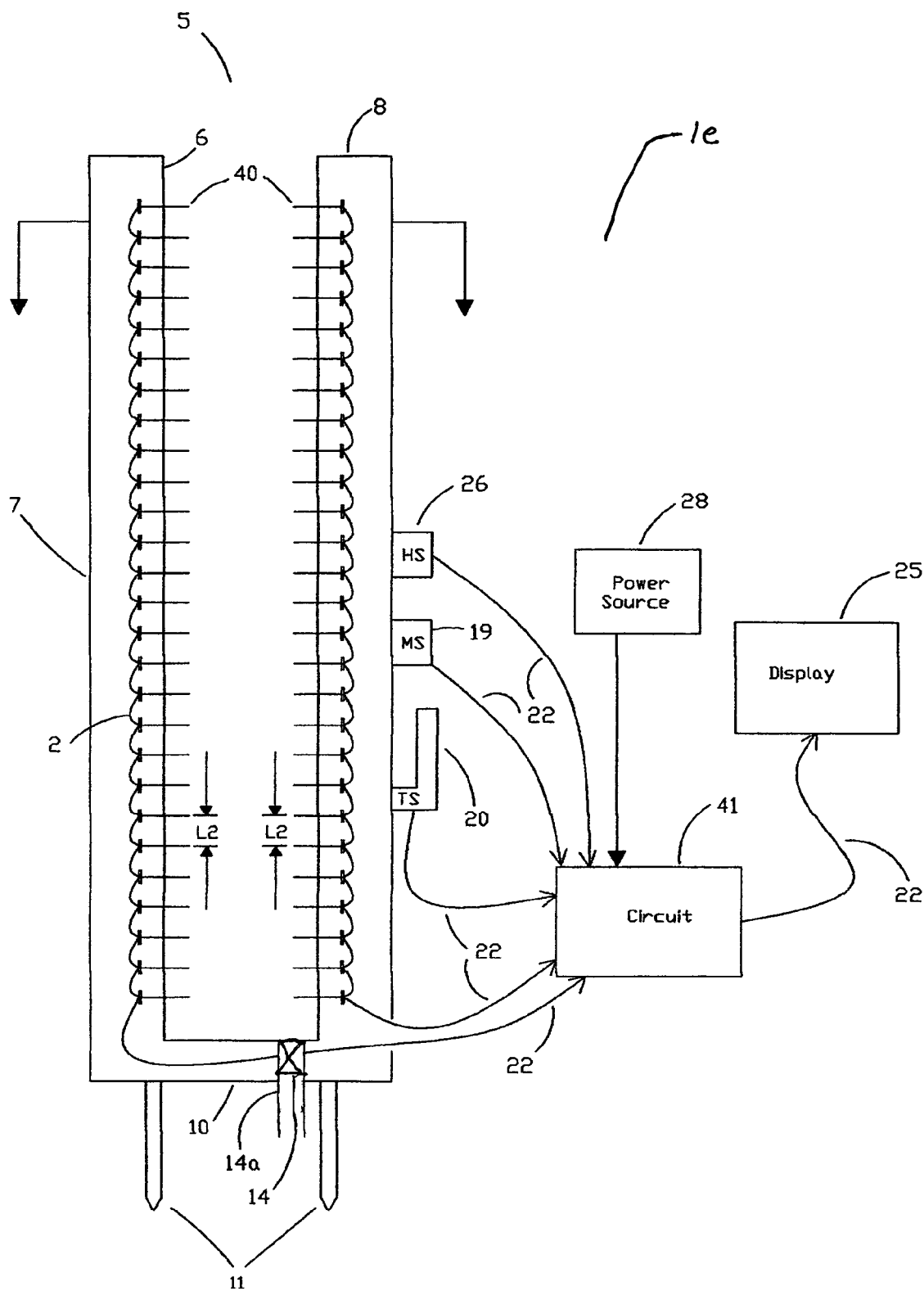
FIG. 12 is a partial sectional view and schematic diagram that illustrates a fifth embodiment of the precipitation gauge of the present invention.
Figure 13:
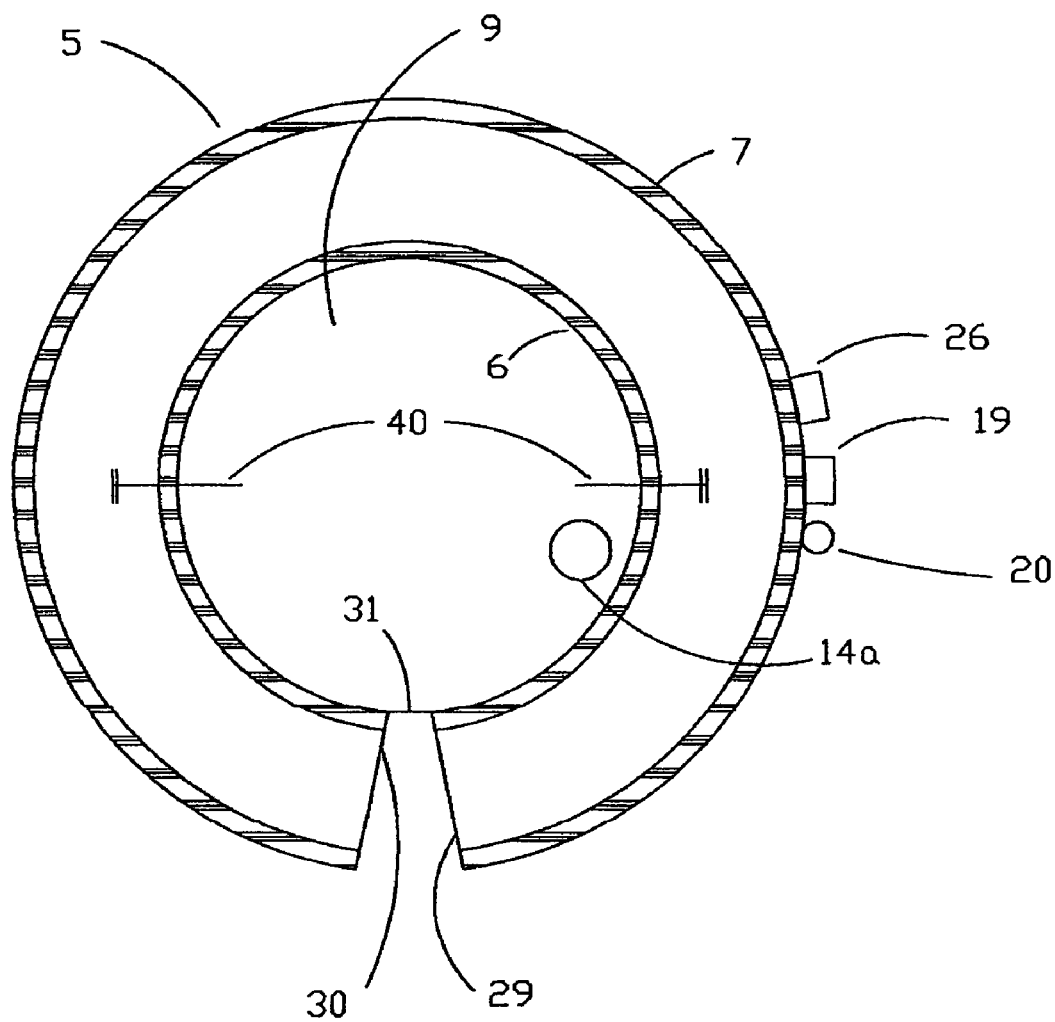
FIG. 13 is a sectional view of the precipitation gauge of FIG. 12 taken along line 1-1.

As shown in FIGS. 12 and 13, in another embodiment 1e of the present invention, pairs of electrodes 40 may be used instead of a light source 16 and light sensor 18 to detect the presence or absence of precipitation. A plurality of electrodes pairs 40 are mounted in a vertical arrangement in a support structure 5 having an inner and an outer side wall 6, 7. Each electrode protrudes a small distance through the inner side wall 4 and is electrically insulated from the inner side wall 4. The precipitation gauge shown in FIG. 12 has 24 pairs of electrodes 40 spaced 1/4 inch apart. It will be understood that the precipitation instrument of the present invention can comprise pairs of electrodes that are spaced from one another by any predetermined distance. For example, a twelve inch cylinder may contain 12 pairs of electrodes (one pair spaced every one inch), 24 pairs of electrodes (one pair spaced every one half inch), or 96 pairs of electrodes (or one pair spaced every 1/8 inch). The pairs of electrodes 40 are connected to circuit 41 that allows current to flow through the pairs of electrodes 40 when precipitation bridges the gap between the pairs of electrodes 40. The gap between the pairs of electrodes 40 should not be so small that precipitation falling between the gap will bridge the gap and complete the circuit to allow current to flow. Preferably, the gap is between 1/8 and 1 inch and more preferably between 1/4 and 1/2 inch. The pairs of electrodes 40 may also be connected to a microprocessor (not shown) instead of a circuit 41 that determines the presence or absence of precipitation in the gap between the pairs of electrodes 40 by determining whether current is flowing through a pair of electrodes 40 or not. If current is flowing through the pair of electrodes 40, then the microprocessor assigns a value such as "1" to that pair of electrodes 40. If current is not flowing through the pair of electrodes, then the microprocessor assigns a value such as "0". After reading each of the pairs of electrodes 40 and assigning a value to each pair of electrodes 40 based on whether or not current is flowing through the electrode pairs, the microprocessor compares the assigned values to a Predetermined Database of Accumulation of Precipitation as set forth in Table 1 above. If, however, the electrode pairs 40 are placed 1/2 inch apart, then the units in Table 1 above would be in 1/2 inches.

In yet another embodiment of the present invention at least one light sensor and at least one pair of electrodes are used to measure precipitation. The light sensor or sensors are mounted on the support structure opposite at least one light source. At least one pair of electrodes is mounted on the support structure between the light source and light sensor. The light sensors output signals, which vary based on the amount of precipitation in the support structure, to microprocessor. The pairs of electrodes also output signals, preferably current, to microprocessor when precipitation is present between the pair of electrodes. The microprocessor may be programmed to determine the amount of precipitation based on one or more output signals from the light sensor or light sensors, determine the amount of precipitation based on one or more output signals from the electrodes, compare the amount of precipitation based on the light sensor or light sensors with the amount of precipitation based on at least one pair of electrodes, determine the amount of precipitation to display by selecting one of the amounts of precipitation or by averaging both amounts of determined precipitation.

In addition to measuring the amount of precipitation, including the amount of frozen precipitation, the present invention may be used to determine the density or wetness of snow. After the snowfall event is over, the user or microprocessor may activate heating element not shown which melts the snow in the support structure. The heating element is configured and located on the support structure to melt any frozen precipitation. The microprocessor then reads the light sensors to determine the level of water resulting from the melted snow. Based on the amount of snow (for example inches or centimeters) and the amount of resulting water (in inches or centimeters, the microprocessor calculates the density of the snow using the following equation: (height of water (e.g. in)×cross sectional area of inner cylinder (e.g. in$^2$)× density of water at measured temperature (e.g. 0.5778 oz/in$^3$ at 60° F.))/height of snow (e.g. in)×cross sectional area of inner cylinder (e.g. in$^2$)=density of snow in oz/in$^3$. Alternatively, the density of the snow can be determined by weighing the amount of snow after the snowfall event. U.S. Pat. No. 6,044,699 entitled "Gauge For Accurately Measuring Precipitation" discloses an apparatus for collecting and weighing precipitation which can be used with the present invention to weight the snow that has accumulated in the precipitation gauge of the present invention. The disclosure of the '699 patent is incorporated fully herein. The density of the snow may be calculated by the microprocessor 21 using the following equation: weight of snow (e.g. oz)/height of snow (e.g. in)×cross sectional area of inner cylinder (e.g. in$^2$).

After determining the density of the snow, the density of the snow can be assigned a number on a density scale which can be correlated to settings on a snow blower. For example, the most dense snow is assigned a value of 5 and the least dense snow is assigned a value of 1. Snow blowers may be assigned settings from 1 to 5 which determines the speed of the snow blower, 1 being fastest and 5 being the slowest speed. After a snowfall, the user can obtain the snow density setting from the precipitation instrument and set the user's snow blower setting accordingly to clear snow at the snow blower's optimum speed without having to determine the proper speed by trial and error. Accordingly, a snow blower having a variable speed drive of at least two settings but preferably 3 to 6 settings that correlate with the density of snow would aid in removing snow as quickly and easily as possible.

The present invention includes a method for detecting the accumulation of precipitation comprising (a) projecting light from a plurality of light sources placed in a vertical arrangement to a plurality of light sensor placed in a corresponding vertical arrangement; (b) obtaining an output signal from each of the light sources; (c) comparing said output signal from each of the light sources with a predetermined threshold value, the value indicating the presence or absence of precipitation; (d) assigning a second value to each of the light sensor based on the comparison; and (e) determining the amount of accumulation of the precipitation based on the second value assigned to each of the light sensors.

The present invention also includes an apparatus and method of determining the density of frozen precipitation. To measure the density of frozen precipitation, the support structure may include a heating element configured to melt an accumulation of frozen precipitation. The heating element may be connected to a microprocessor or to a switch so that the heating element may be powered on or off. After the frozen precipitation event has ended and the microprocessor determines the amount of frozen precipitation, the electrical power is supplied to the heating element to melt the frozen precipitation. The microprocessor then determines the height of the liquid level in the support structure and determines the weight of the liquid by multiplying the height of the liquid by the cross-sectional area of the support structure that holds the liquid and then multiplying that product by the density of water. The equation for determining the weight of the water is height times the cross-sectional area times density of water equals the weight of water. The microprocessor next divides the calculated weight of the water by the product of the height of the frozen precipitation times the cross-sectional area of the support structure that holds the precipitation to determine the density of the frozen precipitation. Alternatively, the precipitation instrument can include a means for weighing the frozen precipitation. In that embodiment, the microprocessor determines the density of the precipitation by dividing the measured weight of the frozen precipitation by the product of the height of the frozen precipitation times the cross-sectional area of the support structure that holds the precipitation.

By providing a convenient and efficient means of determining the density of frozen precipitation, particularly snowfall, users of snow blowing equipment may be aided in operating snow blowing equipment at proper speeds. The present invention would allow manufacturers of snow blowing equipment to include settings on snow blowing equipment that correlate to the density of snow. The average density of snow is about 100 kg/m$^3$ or about 6.37 lbs/ft$^3$. Therefore, ten inches of snow yield about one inch of water. The range of the density of snow is from about 50 kg/m$^3$ (3.19 lb/ft$^3$) for cold, dry conditions to about 150 kg/m$^3$ (9.56 lb/ft$^3$) for warm, wet conditions. Because the density of snow, manufacturers of snow blowing equipment could provide 2 to 10 settings, and preferably 3 to 6 settings that correlate with the density of snow. For example, a setting of 1 could correlate to a snow density of 50 kg/m$^3$ and a setting of 6 could correlate to a snow density of 150 kg/m$^3$.

Many modifications and other embodiments of the invention will come to mind to one skilled in the art to which this invention pertains having the benefit of the teachings presented in the foregoing descriptions and drawings. Therefore, it is to be understood that the invention is not to be limited to the specific embodiments disclosed and that modifications and other embodiments are intended to be included within the scope of the following claims. Although specific terms are used herein, they are used in a generic and descriptive sense only and not for purposes of limitation.

That which is claimed is:

1. An instrument for measuring precipitation comprising:
a support structure;
a plurality of light sensors disposed in a vertical arrangement on said support structure and a plurality of light sources disposed in a vertical arrangement on said support structure, each said light sensor being spaced a predetermined distance from each adjacent light sensor and positioned to receive light from at least one said light sensor and each said light sensor being spaced a predetermined distance from each adjacent said light source, each light sensor being capable of generating an output signal in response to light received from one of said light sources; and
a microprocessor that receives said output signal from at least one of said light sensors and determines the presence or absence of an accumulation of precipitation based on said signal, wherein the microprocessor is programmed to receive a signal from each of said light sensors when precipitation is absent from said support structure and to compare each said signal with an initial signal from each of said light sensors when precipitation is absent to determine when any of said light sensors or light sources or both light sensors and light sources may require cleaning.

2. The instrument according to claim 1 wherein the microprocessor receives said output signal from each of said plurality of light sensors and determines an amount of accumulation of precipitation based on said signals.

3. The instrument according to claim 1 wherein the microprocessor compares said output signal from at least one of said sensors to a predetermined value and assigns a binary number based on said comparison, said binary number representing the presence or absence of precipitation at said sensor.

4. The instrument according to claim 1 wherein the microprocessor compares said output signal from each of said light sensors with a predetermined threshold value and assigns a binary number for each of said light sensors based on said comparison representing the presence or absence of precipitation at said sensor.

5. The instrument according to claim 1 wherein the support structure is a cylindrical container having an open end and a closed end and a cylindrical wall extending between said open end and closed end.

6. The instrument according to claim 5 further comprising a drain valve disposed in said closed end for draining precipitation from said cylinder.

7. The instrument according to claim 6 wherein the drain valve is operably connected to the microprocessor for opening and closing at predetermined times.

8. The instrument according to claim 1 wherein the support structure is a rod or U-shaped rod.

9. The instrument according to claim 1 wherein the support structure is a flat bar or a U-shaped flat bar.

10. The instrument according to claim 1 further comprising a temperature sensor, said temperature sensor capable of transmitting a temperature signal to said microprocessor.

11. The instrument according to claim 10 wherein said temperature sensor is capable of connecting the microprocessor to a power source.

12. An instrument for measuring precipitation comprising:
a support structure;
a plurality of light sensors disposed in a vertical arrangement on said support structure and a plurality of light sources disposed in a vertical arrangement on said support structure, each said light sensor being spaced a predetermined distance from each adjacent light sensor and positioned to receive light from at least one said light sensor and each said light sensor being spaced a predetermined distance from each adjacent said light source, each light sensor being capable of generating an output signal in response to light received from one of said light sources; and a microprocessor that receives said output signal from at least one of said light sensors and determines the presence or absence of an accumulation of precipitation based on said signal and a vibrating device attached to said support structure, said vibrating device capable of vibrating said support structure for removing any pockets of air from said precipitation.

13. An instrument for measuring precipitation comprising:

a support structure configured to collect precipitation;

at least one light sensor, said light sensor capable of generating an output signal which varies in magnitude based on light received by said light sensor, at least one light source disposed on said support structure, said light source being spaced a predetermined distance from said light sensor, said light sensor capable of receiving light from said light source and generating an output signal in response thereto, said light source and said light sensor being positioned so that an accumulation of precipitation in said support structure reduces the amount of light said light sensor receives from said light source, and a microprocessor that receives the output signal from said light sensor and determines a level of precipitation in response to said output signal wherein the microprocessor is programmed to receive a signal from each of said light sensors when precipitation is absent from said support structure and to compare each said signal with an initial signal from each of said light sensors when precipitation is absent to determine when any of said light sensors or light sources or both light sensors and light sources may require cleaning.

14. An instrument for measuring precipitation according to claim 13 wherein the support structure is configured to collect precipitation.

15. An instrument for measuring precipitation according to claim 13 wherein the light sensor is a light sensor array.

* * * * *